US011950062B1

(12) United States Patent
Chu et al.

(10) Patent No.: US 11,950,062 B1
(45) Date of Patent: Apr. 2, 2024

(54) DIRECTION FINDING OF SOUND SOURCES

(71) Applicant: Amazon Technologies, Inc., Seattle, WA (US)

(72) Inventors: Wai Chung Chu, San Jose, CA (US); Carlo Murgia, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 189 days.

(21) Appl. No.: 17/709,563

(22) Filed: Mar. 31, 2022

(51) Int. Cl.
*H04R 3/00* (2006.01)
*G10L 25/21* (2013.01)
*H04R 1/40* (2006.01)

(52) U.S. Cl.
CPC .............. *H04R 3/005* (2013.01); *G10L 25/21* (2013.01); *H04R 1/406* (2013.01)

(58) Field of Classification Search
CPC ...... H04R 3/005; H04R 1/406; H04R 29/005; G10L 25/21
USPC ................................ 381/56, 58, 91, 92, 124
See application file for complete search history.

(56) References Cited

U.S. PATENT DOCUMENTS

| | | | | |
|---|---|---|---|---|
| 10,986,437 | B1 * | 4/2021 | Pan | H04R 1/326 |
| 2019/0355373 | A1 * | 11/2019 | Nesta | G10L 21/028 |
| 2021/0390952 | A1 * | 12/2021 | Masnadi-Shirazi | G10L 15/20 |

* cited by examiner

*Primary Examiner* — William A Jerez Lora
(74) *Attorney, Agent, or Firm* — Pierce Atwood LLP

(57) ABSTRACT

A system configured to improve sound source localization (SSL) processing by reducing a number of direction vectors and grouping the direction vectors into direction cells is provided. The system performs clustering to generate a smaller set of direction vectors included in a delay-direction codebook, reducing a size of the codebook to the number of unique delay vectors. In addition, the system groups the direction vectors into direction cells having a regular structure (e.g., predetermined uniformity and/or symmetry), which simplifies SSL processing and results in a substantial reduction in computational cost. The system may also select between multiple codebooks and/or dynamically adjust the codebook to compensate for changes to the microphone array. For example, a device with a microphone array fixed to a display that can tilt may adjust the codebook based on a tilt angle of the display to improve accuracy.

20 Claims, 23 Drawing Sheets

FIG. 9

Direction Cell Data 910

| Direction Cell | aziMin | aziMax | eleMin | eleMax | Index | Count | invTotalCount |
|---|---|---|---|---|---|---|---|
| 0 | $\theta_0$ | $\theta_1$ | $\Phi_0$ | $\Phi_1$ | $[t_{0,0}, t_{0,1}, \ldots, t_{0,T0}]$ | $[s_{0,0}, s_{0,1}, \ldots, s_{0,s0}]$ | $N_0$ |
| 1 | $\theta_1$ | $\theta_2$ | $\Phi_0$ | $\Phi_1$ | $[t_{1,0}, t_{1,1}, \ldots, t_{1,T1}]$ | $[s_{1,0}, s_{1,1}, \ldots, s_{1,s1}]$ | $N_1$ |
| 2 | $\theta_2$ | $\theta_3$ | $\Phi_0$ | $\Phi_1$ | $[t_{2,0}, t_{2,1}, \ldots, t_{2,T2}]$ | $[s_{2,0}, s_{2,1}, \ldots, s_{2,s2}]$ | $N_2$ |
| ... | ... | ... | ... | ... | ... | ... | ... |
| n | $\theta_{a-1}$ | $\theta_a$ | $\Phi_{e-1}$ | $\Phi_e$ | $[t_{n,0}, t_{n,1}, \ldots, t_{n,Tn}]$ | $[s_{n,0}, s_{n,1}, \ldots, s_{n,sn}]$ | $N_n$ |
| ... | ... | ... | ... | ... | ... | ... | ... |
| N-1 | $\theta_{A-1}$ | $\theta_A$ | $\Phi_{E-1}$ | $\Phi_E$ | $[t_{N-1,0}, \ldots, t_{N-1,TN-1}]$ | $[s_{N-1,0}, \ldots, s_{N-1,sN-1}]$ | $N_{N-1}$ |

Direction Cell Data 920

| Direction Cell | Index | Count | invTotalCount |
|---|---|---|---|
| 0 | $[t_{0,0}, t_{0,1}, \ldots, t_{0,T0}]$ | $[s_{0,0}, s_{0,1}, \ldots, s_{0,s0}]$ | $N_0$ |
| 1 | $[t_{1,0}, t_{1,1}, \ldots, t_{1,T1}]$ | $[s_{1,0}, s_{1,1}, \ldots, s_{1,s1}]$ | $N_1$ |
| 2 | $[t_{2,0}, t_{2,1}, \ldots, t_{2,T2}]$ | $[s_{2,0}, s_{2,1}, \ldots, s_{2,s2}]$ | $N_2$ |
| ... | ... | ... | ... |
| n | $[t_{n,0}, t_{n,1}, \ldots, t_{n,Tn}]$ | $[s_{n,0}, s_{n,1}, \ldots, s_{n,sn}]$ | $N_n$ |
| ... | ... | ... | ... |
| N-1 | $[t_{N-1,0}, \ldots, t_{N-1,TN-1}]$ | $[s_{N-1,0}, \ldots, s_{N-1,sN-1}]$ | $N_{N-1}$ |

Example Direction Cell 930

| Direction Cell | {Index, Count} |
|---|---|
| 5 | $\{t_0, s_0\}$<br>$\{t_3, s_3\}$<br>...<br>$\{t_n, s_n\}$ |

DIRECTION FINDING OF SOUND SOURCES

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 9 illustrates examples of direction cell data according to embodiments of the present disclosure.

DETAILED DESCRIPTION

Electronic devices may be used to capture audio and process audio data. The audio data may be used for voice commands and/or sent to a remote device as part of a communication session. To process voice commands from a particular user or to send audio data that only corresponds to the particular user, the device may attempt to isolate desired speech associated with the user from undesired speech associated with other users and/or other sources of noise, such as audio generated by loudspeaker(s) or ambient noise in an environment around the device. For example, the device may perform sound source localization (SSL) to distinguish between multiple sound sources represented in the audio data. However, SSL processing may be computationally expensive and inefficient.

To improve SSL processing, devices, systems and methods are disclosed that reduce a number of direction vectors included in a delay-direction codebook and group the direction vectors into direction cells. The system may perform clustering to generate a smaller set of direction vectors, reducing a size of the codebook to the number of unique delay vectors. In addition, the system groups the direction vectors into direction cells having a regular structure (e.g., predetermined uniformity and/or symmetry), which simplifies SSL processing and results in a substantial reduction in computational cost. The system may also select between multiple codebooks and/or dynamically adjust the codebook to compensate for changes to the microphone array. For example, a device with a microphone array fixed to a display that can tilt may adjust the codebook based on a tilt angle of the display to improve accuracy.

Figure 1:
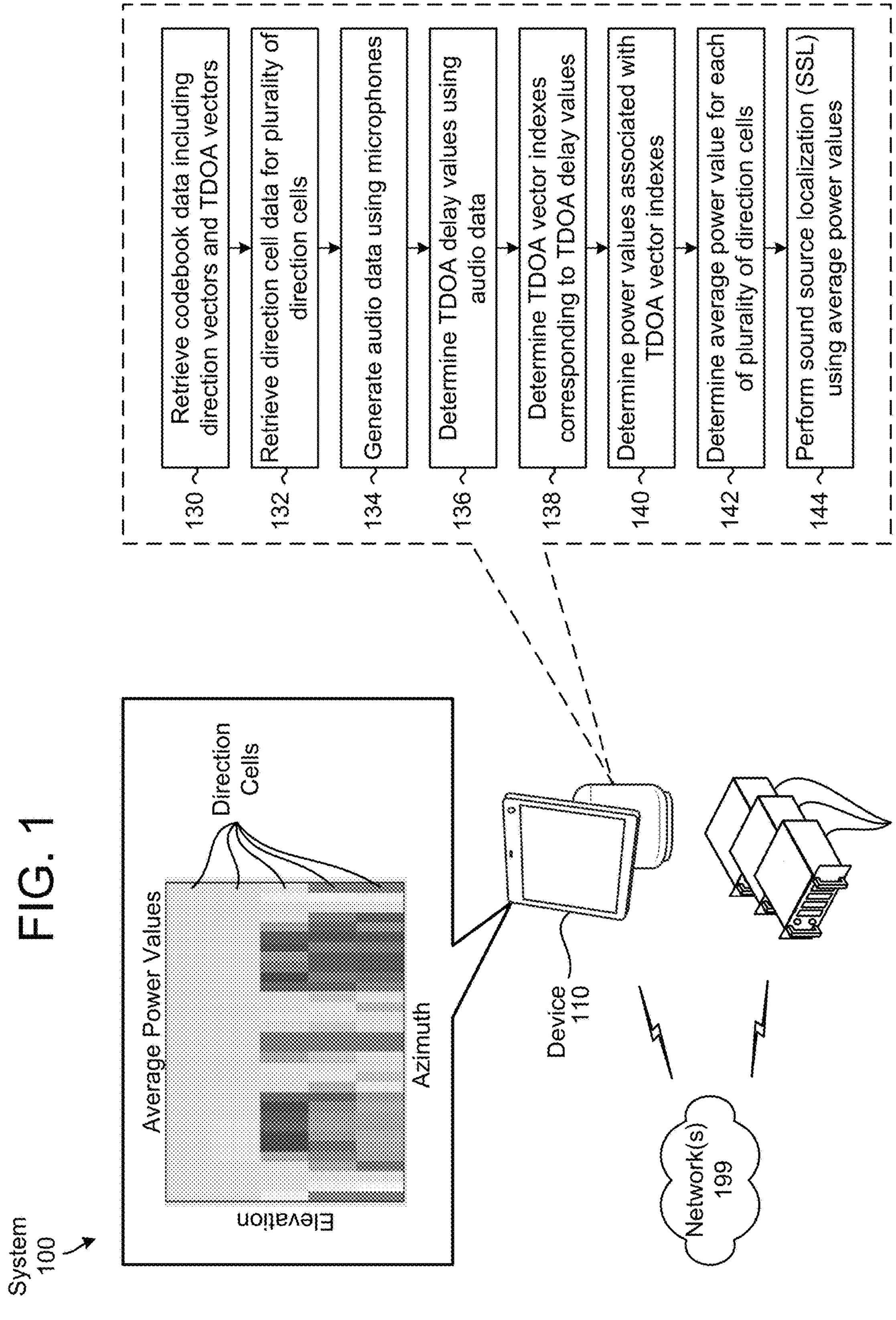
FIG. 1 illustrates a system configured to perform direction finding of sound sources according to embodiments of the present disclosure.

FIG. 1 illustrates a high-level conceptual block diagram of a system 100 configured to perform direction finding of sound sources according to embodiments of the present disclosure. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110 and remote device(s) 120 that may be communicatively coupled to network(s) 199.

As will be described in greater detail below, FIG. 1 illustrates an example of the device 110 determining average power values using delay-direction codebook data and/or direction cell data. In some examples, the remote device(s) 120 may generate the delay-direction codebook data and/or the direction cell data during an initialization stage and send this data to the device 110 to use during runtime operation. However, the disclosure is not limited thereto, and in other examples the device 110 may generate and/or modify the delay-direction codebook data and/or the direction cell data without departing from the disclosure.

The device 110 may be an electronic device configured to capture and/or receive audio data. For example, the device 110 may include a microphone array configured to generate microphone audio data that captures input audio, although the disclosure is not limited thereto and the device 110 may include multiple microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data. Whether the microphones are included as part of a microphone array, as discrete microphones, and/or a combination thereof, the device 110 generates the microphone audio data using multiple microphones. For example, a first channel of the microphone audio data may correspond to a first microphone (e.g., k=1), a second channel may correspond to a second microphone (e.g., k=2), and so on until a final channel (K) corresponds to final microphone (e.g., k=K).

The audio data may be generated by a microphone array of the device 110 and therefore may correspond to multiple channels. For example, if the microphone array includes eight individual microphones, the audio data may include eight individual channels. The device 110 may perform sound source localization processing to separate the audio data based on sound source(s) and indicate when an individual sound source is represented in the audio data and/or a direction associated with the sound source.

To illustrate an example, the device 110 may detect a first sound source (e.g., first portion of the audio data corresponding to a first direction relative to the device 110) during a first time range, a second sound source (e.g., second portion of the audio data corresponding to a second direction relative to the device 110) during a second time range, and so on. The directions relative to the device 110 may be represented using azimuth values (e.g., value that varies between 0 and 360 degrees and corresponds to a horizontal direction) and/or elevation values (e.g., value that varies between 0 and 180 degrees and corresponds to a vertical direction).

While the device 110 may detect multiple overlapping sound sources within the same portion of audio data, variations between the individual microphone channels enable the device 110 to distinguish between them based on their relative direction. Thus, the SSL data may include a first portion or first SSL data indicating when the first sound source is detected, a second portion or second SSL data indicating when the second sound source is detected, and so on. In some examples, the SSL data may include multiple SSL tracks (e.g., individual SSL track for each unique sound source represented in the audio data), along with additional information for each of the individual SSL tracks. For example, for a first SSL track corresponding to a first sound source (e.g., audio source), the SSL data may indicate a position and/or direction associated with the first sound source location, a signal quality metric (e.g., power value) associated with the first SSL track, and/or the like, although the disclosure is not limited thereto.

To perform SSL processing, the device 110 may use Time Difference of Arrival (TDOA) processing, Time of Arrival (TOA) processing, Delay of Arrival (DOA) processing, and/or the like, although the disclosure is not limited thereto. For ease of illustration, the following description will refer to using TDOA processing, although the disclosure is not limited thereto and the device 110 may perform SSL processing using other techniques without departing from the disclosure. SSL processing, such as steered response power (SRP), relies on a delay-direction codebook in order to calculate power as a function of direction. For example, the device 110 may use the delay-direction codebook to calculate power values and may then use the power values to estimate a direction associated with the sound source.

The codebook may consist of a collection of delay vectors (e.g., TDOA vectors) together with direction vectors, and the codebook may be determined based on the locations of the microphones and the physical dimensions or shape of an enclosure of the device 110. The direction vectors may be represented as either spherical coordinates (e.g., azimuth $\theta$ and elevation $\Phi$) and/or as rectangular coordinates (e.g., three components in the x, y, and z axes, with the resultant vector having unit length), and the device 110 may convert from one representation to the other without departing from the disclosure. As used herein, vectors may include two or more values and may be represented by vector data. Thus, a delay vector may correspond to delay values and/or delay vector data without departing from the disclosure. For ease of illustration, the delay vectors may be referred to as TDOA vectors, TDOA delay vectors, delay vector values, TDOA delay values, delay vector data, TDOA vector data, and/or the like without departing from the disclosure. Similarly, the direction vectors may be referred to as direction vector values, direction vector data, and/or the like.

As illustrated in FIG. 1, the device 110 may retrieve (130) codebook data including direction vectors and TDOA vectors, and may retrieve (132) direction cell data for a plurality of direction cells. Codebook data, direction vectors, and TDOA vectors are described in greater detail below with regard to FIGS. 3-4B and 8, while direction cells are described in greater detail below with regard to FIGS. 5A-5B and 9.

The device 110 may generate (134) audio data using microphones, may determine (136) TDOA delay values using the audio data, and may determine (138) TDOA vector indexes corresponding to TDOA delay values. For example, the device 110 may perform TDOA processing to the audio data to generate the TDOA delay values and may use the codebook data to determine the TDOA vector indexes based on the TDOA delay values.

The device 110 may determine (140) power values associated with the TDOA vector indexes and may determine (142) an average power value for each of the plurality of direction cells. For example, the device 110 may determine the power values associated with the TDOA vector indexes as part of performing TDOA processing. In addition, the device 110 may use the direction cell data to determine a number of count values associated with each of the TDOA vector indexes in a particular direction cell. By multiplying the count values by a corresponding TDOA power value, summing these products, and dividing by a total number of count values for the direction cell, the device 110 may determine the average power for the direction cell.

After determining the average power values, the device 110 may perform (144) sound source localization using the average power values. For example, the device 110 may identify a local peak represented in the average power values and determine a direction of a sound source corresponding to the local peak. By performing sound source localization, in some examples the system may identify a sound source associated with desired speech and may use the SSL data to track this sound source over time. For example, the device 110 may isolate a portion of the audio data corresponding to a first sound source and may cause the portion of the audio data to be processed to determine a voice command.

In some examples, the device 110 may be configured to perform natural language processing to determine the voice command and may perform an action corresponding to the voice command. However, the disclosure is not limited thereto and in other examples the device 110 may be configured to send the portion of the audio data to a natural language processing system to determine the voice command without departing from the disclosure.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), adaptive interference cancellation (AIC), noise reduction (NR) processing, tap detection, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

Figure 2:
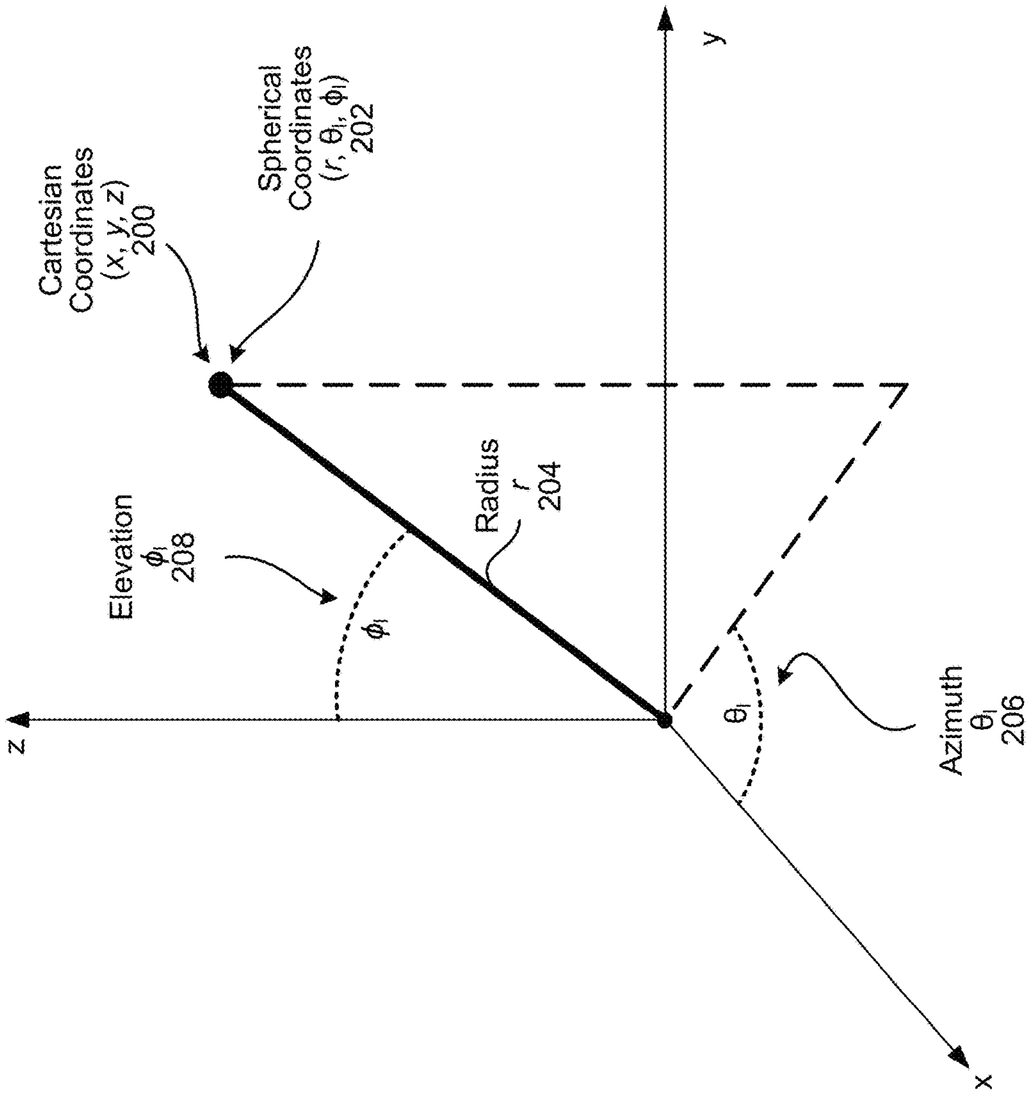
FIG. 2 illustrates an example of spherical coordinates and rectangular coordinates.

FIG. 2 illustrates an example of spherical coordinates, which may be used throughout the disclosure with reference to acoustic waves relative to the microphone array. As illustrated in FIG. 2, Cartesian coordinates (x, y, z) 200 correspond to spherical coordinates (r, $\theta_1$, $\phi_1$) 202. Thus, using Cartesian coordinates, a location may be indicated as a point along an x-axis, a y-axis, and a z-axis using coordinates (x, y, z), whereas using spherical coordinates the same location may be indicated using a radius r 204, an azimuth $\theta_1$ 206, and an elevation $\phi_1$ 208 (e.g., polar angle). The radius r 204 indicates a radial distance of the point from a fixed origin, the azimuth $\theta_1$ 206 indicates an azimuth angle of its orthogonal projection on a reference plane that passes through the origin and is orthogonal to a fixed zenith direction, and the elevation $\phi_1$ 208 indicates a polar angle measured from the fixed zenith direction. Thus, the azimuth $\theta_1$ 206 varies between 0 and 360 degrees, while the elevation $\phi_1$ 208 varies between 0 and 180 degrees.

As described above with regard to FIG. 1, the device 110 may generate audio data using a microphone array of the device 110 and therefore the audio data may correspond to multiple channels. For example, if the microphone array includes eight individual microphones, the audio data may include eight individual channels. The device 110 may perform sound source localization (SSL) processing using the audio data to generate SSL data. For example, the device 110 may perform SSL processing to separate the audio data based on sound source and indicate when an individual sound source is represented in the audio data.

To illustrate an example, the device 110 may detect a first sound source (e.g., first portion of the audio data corresponding to a first direction relative to the device 110) during a first time range, a second sound source (e.g., second portion of the audio data corresponding to a second direction relative to the device 110) during a second time range, and so on. The directions relative to the device 110 may be represented using azimuth values (e.g., value that varies between 0 and 360 degrees and corresponds to a horizontal direction) and/or elevation values (e.g., value that varies between 0 and 180 degrees and corresponds to a vertical direction). While the device 110 may detect multiple overlapping sound sources within the same portion of audio data, variations between the individual microphone channels enable the device 110 to distinguish between them based on their relative direction. Thus, the SSL data may include a first portion or first SSL data indicating when the first sound source is detected, a second portion or second SSL data indicating when the second sound source is detected, and so on.

To perform SSL processing, the device 110 may use Time Difference of Arrival (TDOA) processing, Time of Arrival (TOA) processing, Delay of Arrival (DOA) processing, and/or the like, although the disclosure is not limited thereto. For ease of illustration, the following description will refer to using TDOA processing, although the disclosure is not limited thereto and the device 110 may perform SSL processing using other techniques without departing from the disclosure. In some examples, the SSL data may include multiple SSL tracks (e.g., individual SSL track for each unique sound source represented in the audio data), along with additional information for each of the individual SSL tracks. For example, for a first SSL track corresponding to a first sound source (e.g., audio source), the SSL data may indicate a position and/or direction associated with the first sound source location, a signal quality metric (e.g., power value) associated with the first SSL track, and/or the like, although the disclosure is not limited thereto.

Figure 3:
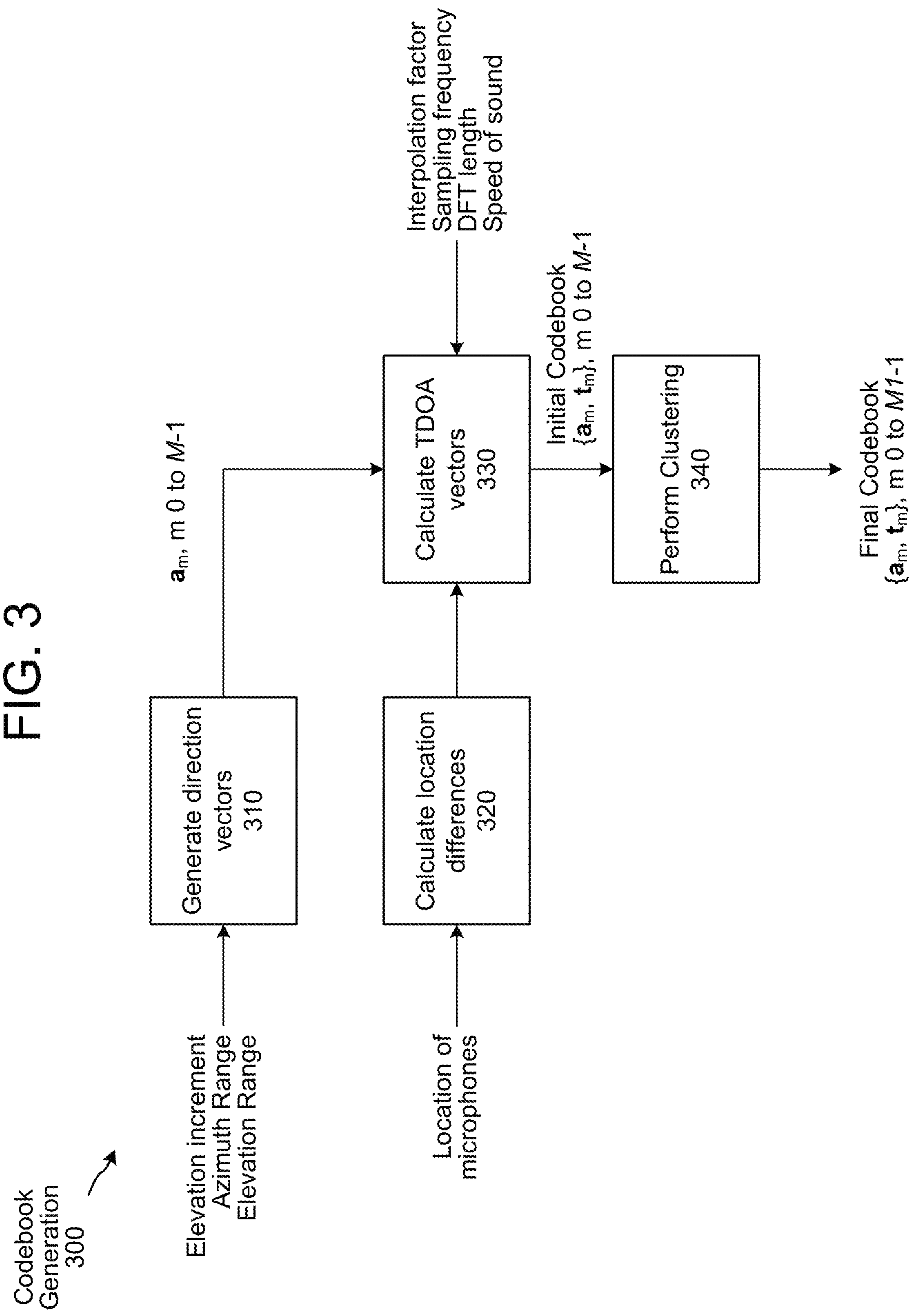
FIG. 3 illustrates an example of delay-direction codebook generation according to examples of the present disclosure.

FIG. 3 illustrates an example of delay-direction codebook generation according to examples of the present disclosure. As described above, the device 110 may perform SSL processing, such as steered response power (SRP), which relies on a delay-direction codebook in order to calculate power as a function of direction. For example, the device 110 may use the delay-direction codebook to calculate the power values and may then use the power values to estimate a direction associated with the sound source.

The codebook may consist of a collection of delay vectors (e.g., TDOA vectors) together with direction vectors, and the codebook may be determined based on the locations of the microphones and the physical dimensions or shape of an enclosure of the device 110. The direction vectors may be represented as either spherical coordinates (e.g., azimuth θ and elevation Φ) and/or as rectangular coordinates (e.g., three components in the x, y, and z axes, with the resultant vector having unit length), and the device 110 may convert from one representation to the other without departing from the disclosure.

As illustrated in FIG. 3, the device 110 may perform codebook generation 300 to generate an initial codebook and a final codebook. For example, the device 110 may generate (310) a set of $M_0$ candidate direction vectors (e.g., $a_m$, where m=0 to $M_0-1$) and the initial codebook may include each of the $M_0$ candidate direction vectors. Thus, the initial codebook may represent all potential directions of sound sources (e.g., depending on a desired resolution) with respect to the microphone array and/or the device 110. In contrast, the final codebook may include a set of $M_1$ candidate direction vectors (e.g., $a_m$, where m=0 to $M_1-1$) that corresponds to a subset of the potential directions of sound sources, as described in greater detail below.

The number of candidate direction vectors (e.g., $M_0$) may vary depending on a desired resolution associated with the codebook and/or the device 110. For example, if the device 110 includes a small number of microphones, an individual TDOA value may correspond to a large range of directions, so the device 110 may generate the codebook using a lower resolution. In contrast, if the device 110 includes a large number of microphones, the TDOA values may correspond to a small range of directions, so the device 110 may generate the codebook using a higher resolution to take advantage of the increased precision offered by the large number of microphones.

In the example illustrated in FIG. 3, the device 110 may generate the candidate direction vectors based on an elevation increment, an azimuth range, and an elevation range, although the disclosure is not limited thereto. While the system 100 may generate the candidate direction vectors using a variety of techniques without departing from the disclosure, SSL processing may be improved if the candidate direction vectors are near-uniformly distributed for the entire sphere: $\theta \in [-\pi, \pi]$ and $\phi \in [0, \pi]$. Thus, each candidate direction vector may be specified by the pair {θ, ϕ,} and can be converted to rectangular coordinates {x, y, z}.

The microphone array may include K microphones, with known locations given by:

$$u_n = \begin{bmatrix} x_n \\ y_n \\ z_n \end{bmatrix}, n = 0 \text{ to } K-1 \quad [1]$$

where $u_n$ indicates three-dimensional (3D) coordinates of the nth microphone, which are expressed in some unit of distance (e.g., meter). Depending on the microphone locations, and the direction-of-arrival of a given sound, said sound reaches different microphones at different times. By measuring the TDOA caused by the sound, it is possible to estimate the direction-of-arrival. For example, there are a total of:

$$P = \binom{K}{2} = \frac{K(K-1)}{2} \quad [2]$$

microphone pairs for which the device 110 must calculate delay values in order to accurately estimate the direction-of-arrival.

Table 1 shows an example of microphone indices for the case of K=4. For example, a first microphone pair may include Mic0 and Mic1, a second microphone pair may include Mic0 and Mic2, and so on.

TABLE 1

The indices for microphone pairs when K = 4.

| k | index0 | index1 |
|---|---|---|
| 0 | 0 | 1 |
| 1 | 0 | 2 |
| 2 | 0 | 3 |
| 3 | 1 | 2 |

TABLE 1-continued

The indices for microphone pairs when K = 4.

| k | index0 | index1 |
|---|---|---|
| 4 | 1 | 3 |
| 5 | 2 | 3 |

In order to estimate the direction-of-arrival, the device 110 may find a TDOA vector for each direction vector. To find the TDOA vector, the device 110 may calculate (320) the location difference vectors using:

$$d_k = u_{index1[k]} - u_{index0[k]}, k=0 \text{ to } P-1 \quad [3]$$

where $d_k$ denotes the location difference vector for an individual microphone pair, which is a 3D vector with the three elements of the vector representing distance quantities.

Given the candidate direction vectors (e.g., $a_m$) and the location difference vectors $d_k$ described above, the device 110 may determine elements of the TDOA vectors, as shown below:

$$\tau_{m,k} = a_m^T d_k / c \quad [4]$$

where $\tau_{m,k}$ denotes a time delay, the candidate direction vectors $a_m$ are unit-length 3D vectors representing a direction in rectangular coordinates, and c is the speed of sound (e.g., 343 m/s).

The resulting time delay $\tau_{m,k}$ is a real number (or floating-point number) that may be negative or positive, measured in seconds. Thus, the device 110 may convert the time delay $\tau_{m,k}$ to a positive integer in the range of [0, intFactor·N−1], with intFactor a positive integer interpolation factor, and N the length of discrete Fourier transform (DFT) used. Typically DFT is used in cross-correlation calculation. The conversion is done with $$t = \text{modulo}(\text{round}(\tau \cdot fs \cdot \text{intFactor}), \text{intFactor} \cdot N) \quad [5]$$

where fs is a sampling frequency measured in Hertz (Hz), and round(x) is a function that rounds x to the nearest integer. Given |x|<N, then:

$$\text{modulo}(x, N) = \begin{cases} x, & \text{if } x \geq 0 \\ x + N, & \text{otherwise} \end{cases} \quad [6]$$

The device 110 may calculate (330) the TDOA vectors as:

$$t_m = \begin{bmatrix} t_{m,0} \\ t_{m,1} \\ \vdots \\ t_{m,P-1} \end{bmatrix}, m = 0 \text{ to } M-1 \quad [7]$$

where $t_m$ denotes a TDOA vector containing P elements (k=0 to P−1), where the kth element ($\tau_{m,k}$) contains the time delay between the microphones at index0[k] and index1[k] having values in the range of [0, intFactor·N−1], with N equal to the DFT length used in cross-correlation calculation.

As illustrated in FIG. 3, the set of $M_0$ candidate direction vectors (e.g., $a_m$, where m=0 to $M_0-1$), together with the associated $M_0$ TDOA vectors $t_m$, may be jointly referred to as the initial delay-direction codebook:

$$\{a_m, t_m\}, m=0 \text{ to } M_0-1 \quad [8]$$

with $M_0$ the size of the codebook. However, as multiple candidate direction vectors may map to the same TDOA vector, the initial codebook may include redundant information. When performing SRP processing, this redundancy results in wasted computation, as the device 110 can only distinguish directions having different TDOA vectors.

To improve efficiency, the device 110 may perform (340) clustering to group the candidate direction vectors based on a number of unique TDOA vectors. For example, the device 110 may compare the $M_0$ TDOA vectors with each other, creating a new TDOA vector index for each unique TDOA vector, which results in $M_1$ distinct TDOA vector indexes. As used herein, a TDOA vector index may be referred to as a TDOA index or index without departing from the disclosure. As part of determining the TDOA indexes, the device 110 may assign a corresponding TDOA index to each of the $M_0$ candidate direction vectors, such that if different candidate direction vectors are associated with the same TDOA vector, they are assigned the same TDOA index.

After assigning the $M_0$ candidate direction vectors a corresponding TDOA vector, the device 110 may group together candidate direction vectors having the same TDOA index. By clustering these candidate direction vectors together, the device 110 may generate a set of $M_1$ clustered direction vectors (e.g., $a_m$, where m=0 to $M_1-1$) that have a 1:1 correspondence with the $M_1$ TDOA vectors. For example, the device 110 may average the rectangular coordinates of candidate direction vectors for each TDOA index to determine centroids, and then apply the arithmetic mean to determine the final direction vectors of the centroids. To illustrate an example, the device 110 may determine that first candidate direction vectors are associated with a first TDOA index $t_1$, may accumulate the parameters for all of the first candidate direction vectors to determine a first centroid, and then may apply the arithmetic mean to determine a first clustered direction vector $a_1$ corresponding to the first centroid. In some examples, the device 110 may determine the final direction vectors by determining the azimuth and elevation of each centroid using the rectangular coordinates.

As illustrated in FIG. 3, the set of $M_1$ clustered direction vectors (e.g., $a_m$, where m=0 to $M_1-1$), together with the associated $M_1$ TDOA vectors $t_m$, may be jointly referred to as the final delay-direction codebook:

$$\{a_m, t_m\}, m=0 \text{ to } M_1-1 \quad [9]$$

with $M_1$ the size of the final codebook. Examples of direction clusters (e.g., collection of candidate direction vectors associated with the same TDOA index) and direction centroids (e.g., clustered direction vectors stored in the final codebook) are shown below.

Figure 4A:
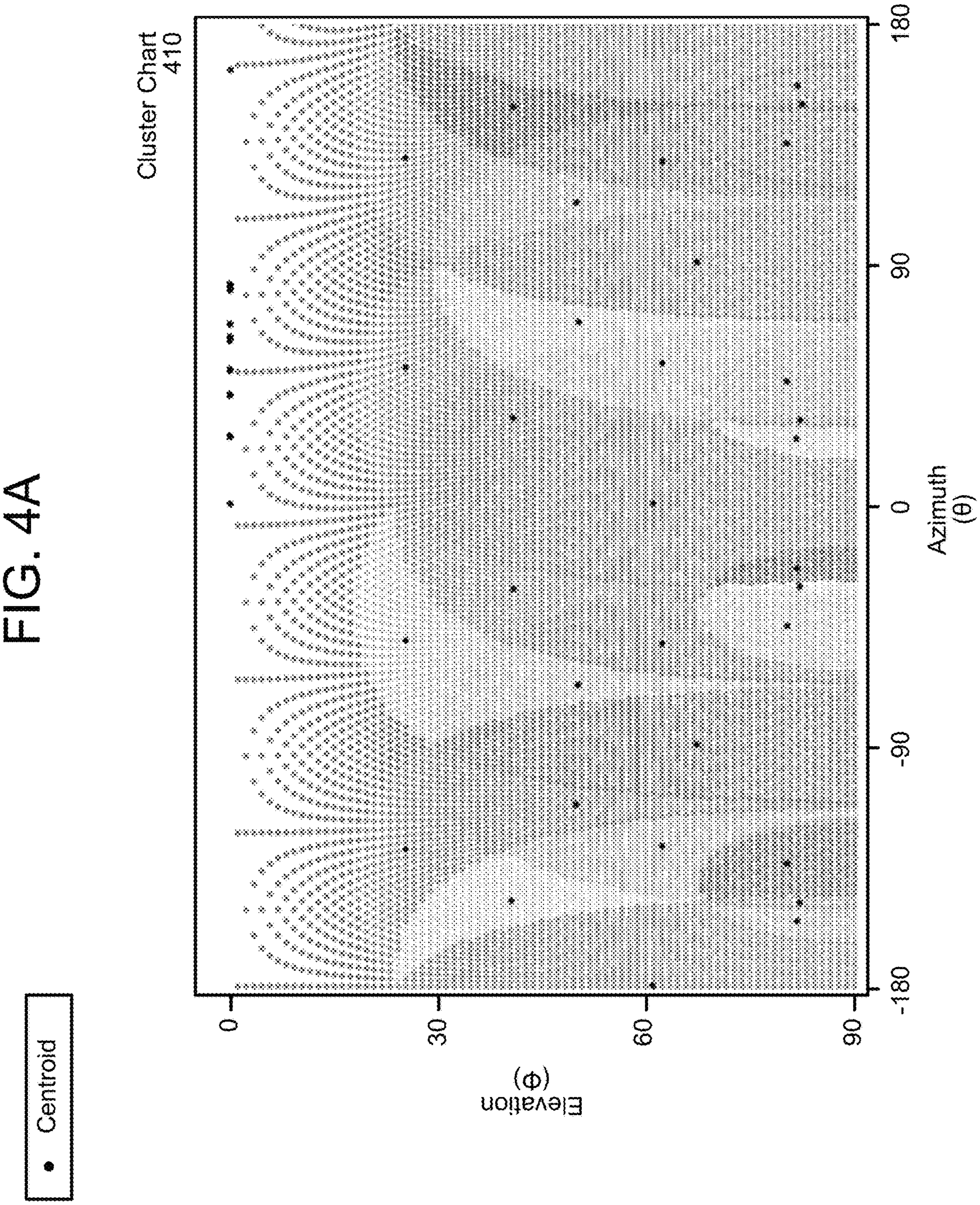
FIGS. 4A-4B illustrate examples of candidate direction vectors and corresponding clusters according to examples of the present disclosure.
Figure 4B:
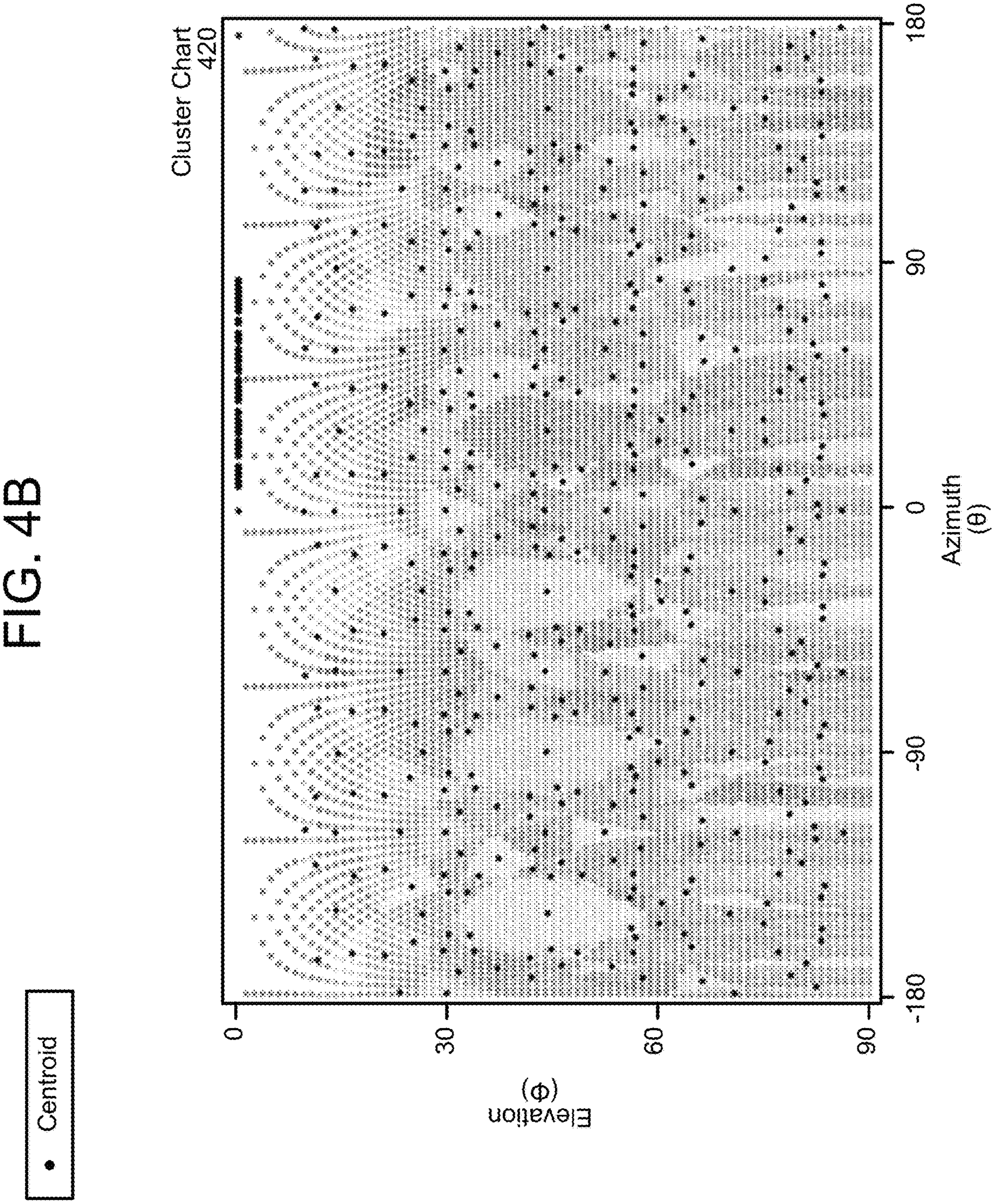

FIGS. 4A-4B illustrate examples of candidate direction vectors and corresponding clusters according to examples of the present disclosure. As described above, a plurality of candidate direction vectors may be near-uniformly distributed for the entire sphere, extending from a minimum azimuth (e.g., $\theta_{min}=-\pi$ radians or −180°) to a maximum azimuth (e.g., $\theta_{max}=\pi$ radians or 180°) and from a minimum elevation (e.g., $\phi_{min}=0$ radians or 0°) to a maximum elevation (e.g., $\phi_{max}=\pi/2$ radians or 90°). Thus, each candidate direction vector may be specified by the pair $\{\theta_m, \phi_m\}$.

As illustrated in FIG. 4A, each candidate direction vector is represented in first cluster chart 410 as an individual dot. However, FIG. 4A illustrates normalized candidate direction vectors, such that the horizontal axis corresponds to azimuth values between [−180°, 180° ] and the vertical axis corresponds to elevation values between [0°, −90° ]. Thus, the first cluster chart 410 extends from a minimum azimuth (e.g., $\theta_{min}=-180°$) to a maximum azimuth (e.g., $\theta_{max}=180°$) and from a minimum elevation (e.g., $\phi_{min}=0$) to a maximum elevation (e.g., $\phi_{max}=90°$).

The first cluster chart 410 corresponds to a first microphone array that only includes four microphones (e.g., K=4), which makes it easier to illustrate individual clusters. For example, the first cluster chart 410 illustrates candidate direction vector as an individual dot, with direction clusters represented by a collection of dots having the same color. Thus, each group of similarly colored dots represents a collection of candidate direction vectors that are associated with the same TDOA index. In addition, the first cluster chart 410 illustrates a direction centroid associated with each direction cluster as a black dot. Thus, the black dots represented in the first cluster chart 410 correspond to the clustered direction vectors stored in the final codebook.

In contrast, FIG. 4B illustrates a second cluster chart 420 that corresponds to a second microphone array. The second microphone array increases the number of microphones from four to seven (e.g., K=7), which results in a large increase in the number of clusters/centroids and much higher resolution. For example, while the second cluster chart 420 also illustrates a collection of candidate direction vectors that are associated with the same TDOA index as a group of similarly colored dots, the second cluster chart 420 includes a large number of much smaller clusters. Thus, an average number of candidate direction vectors associated with each cluster is lower than the first cluster chart 410 illustrated in FIG. 4A.

As illustrated in FIGS. 4A-4B, increasing the number of microphones results in a larger number of clusters/centroids, which enables the device 110 to determine a direction of a sound source with improved accuracy and/or higher resolution. For example, the second cluster chart 420 includes more clusters, the clusters are smaller and include fewer candidate direction vectors, and the centroids more accurately represent a direction associated with the cluster.

While the final delay-direction codebook reduces the number of direction vectors (e.g., from $M_0$ to $M_1$) and corresponding computational consumption, the distribution of direction vectors is irregular as the density of centroids varies within the range of interest. This irregularity makes further processing more challenging and costly. To illustrate an example, in order for the device 110 to determine whether a power peak is present at a given direction, the device 110 must compare the power at the given direction to powers at neighboring directions. However, as the direction vectors are irregularly distributed, finding the neighboring directions becomes more complicated and results in a high computational cost. This irregularity is illustrated by the locations of the direction centroids shown in FIG. 4B.

To facilitate power data analysis and simplify the process of comparing power values between neighboring directions, the device 110 may group the direction vectors into direction cells with a regular structure. The device 110 may group the direction vectors into the direction cells according to a desired resolution and coverage, and this grouping may simplify management of system resources and result in a substantial reduction in computational cost. For example, each direction cell may represent a partition of the direction space (e.g., $\theta\in[-\pi, \pi]$ and $\phi\in[0, \pi/2]$ in radians, or $\theta\in[-180°, 180°]$ and $\phi\in[0°, 90°]$ in degrees), with the partition having predetermined uniformity and/or symmetry. In some examples, the device 110 may perform power averaging based on the direction cells and may find peaks in the power data using stored direction cell data. For example, based on the direction cells and the boundaries of each direction cell, the device 110 may assign different direction vectors to the direction cell, with the average power of the direction cell found using a weighted average process, which is described in greater detail below.

In some examples, the device 110 may partition the entire space into direction cells, where each direction cell has well-defined boundaries specified by four numbers: aziMin, aziMax, eleMin, and eleMax. Using these boundary values, the device 110 may determine that a direction vector given by an azimuth and elevation ($\theta_m$, $\phi_m$) is inside the direction cell if aziMin$\leq\theta_m\leq$aziMax and eleMin$\leq\phi_m\leq$eleMax. There are multiple techniques by which the device 110 may partition the space to form cells, but the device 110 may focus on a top semi-sphere with boundaries $\theta\in[-180°, 180°]$ and $\phi\in[0°, 90°]$, although the disclosure is not limited thereto.

In some examples, the device 110 may partition the space using a uniform division of the entire range of elevation into a number of intervals, with the number of azimuth divisions given for each elevation interval. For example, the device 110 may determine to partition the space into four elevation intervals (e.g., numEle=4) and may divide the elevation evenly so that each of the four elevation intervals have an identical height (e.g., $\Delta\phi$=90°/4=22.5°). While the device 110 partitions the space evenly into the four elevation intervals, a number of azimuth divisions may vary between the four elevation intervals.

To illustrate a conceptual example, the device 110 may divide a first elevation interval into 1 direction cell, a second elevation interval into 8 direction cells, a third elevation interval into 32 direction cells, and a fourth elevation interval into 32 direction cells (e.g., numAzi={1, 8, 32, 32}). This results in a total of 73 direction cells, but the number of candidate direction vectors included in each direction cell has large variations, which is impairs processing as uniform distribution is ideal. However, the disclosure is not limited thereto and the device 110 may partition the space using different numbers of elevation intervals, azimuth divisions, and/or the like without departing from the disclosure.

In other examples, the device 110 may partition the space using a non-uniform division of the entire range of elevation into a number of intervals, with the number of azimuth divisions given for each elevation interval. For example, the device 110 may determine to partition the space into five elevation intervals (e.g., numEle=5), with the elevation boundaries varying between the elevation intervals (e.g., ele={0, 15, 30, 50, 70, 90}). Thus, the device 110 may determine that the first two elevation intervals are slightly different than the other three elevation intervals, although the disclosure is not limited thereto. As described above, the device 110 may define a number of azimuth divisions for each of the elevation intervals and the number of azimuth divisions may vary without departing from the disclosure. For example, the device 110 may divide a first elevation interval into 1 direction cell, a second elevation interval into 8 direction cells, a third elevation interval into 16 direction cells, a fourth elevation interval into 32 direction cells, and a fifth elevation interval into 16 direction cells (e.g., numAzi={1, 8, 16, 32, 16}). This results in a total of 73 direction cells, but while the number of candidate direction vectors included in each direction cell has lower variations than the previous example, the lower elevation intervals still have a higher concentration of candidate direction vectors.

Figure 5A:
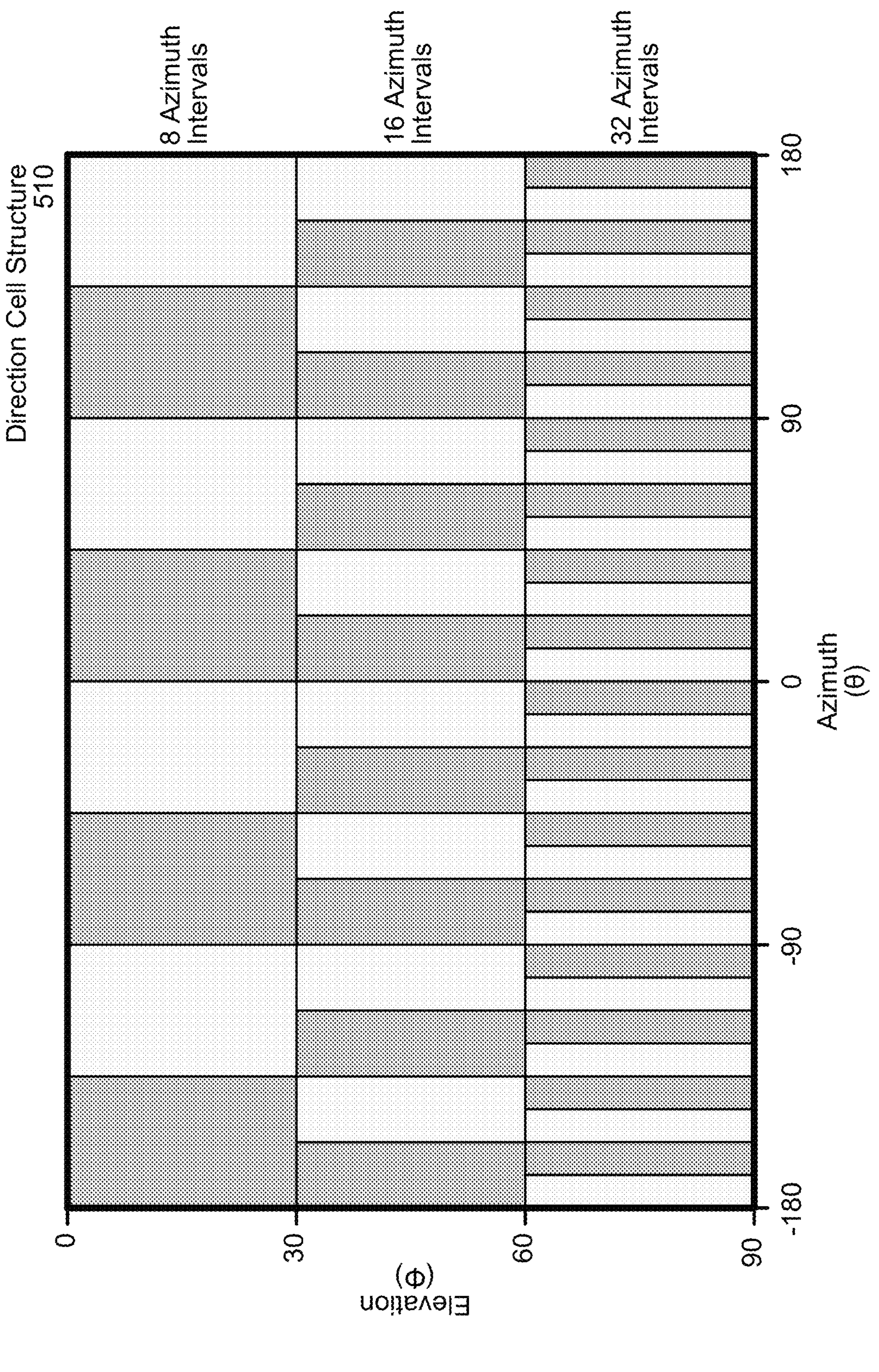
FIGS. 5A-5B illustrate examples of direction cell structure according to examples of the present disclosure.
Figure 5B:
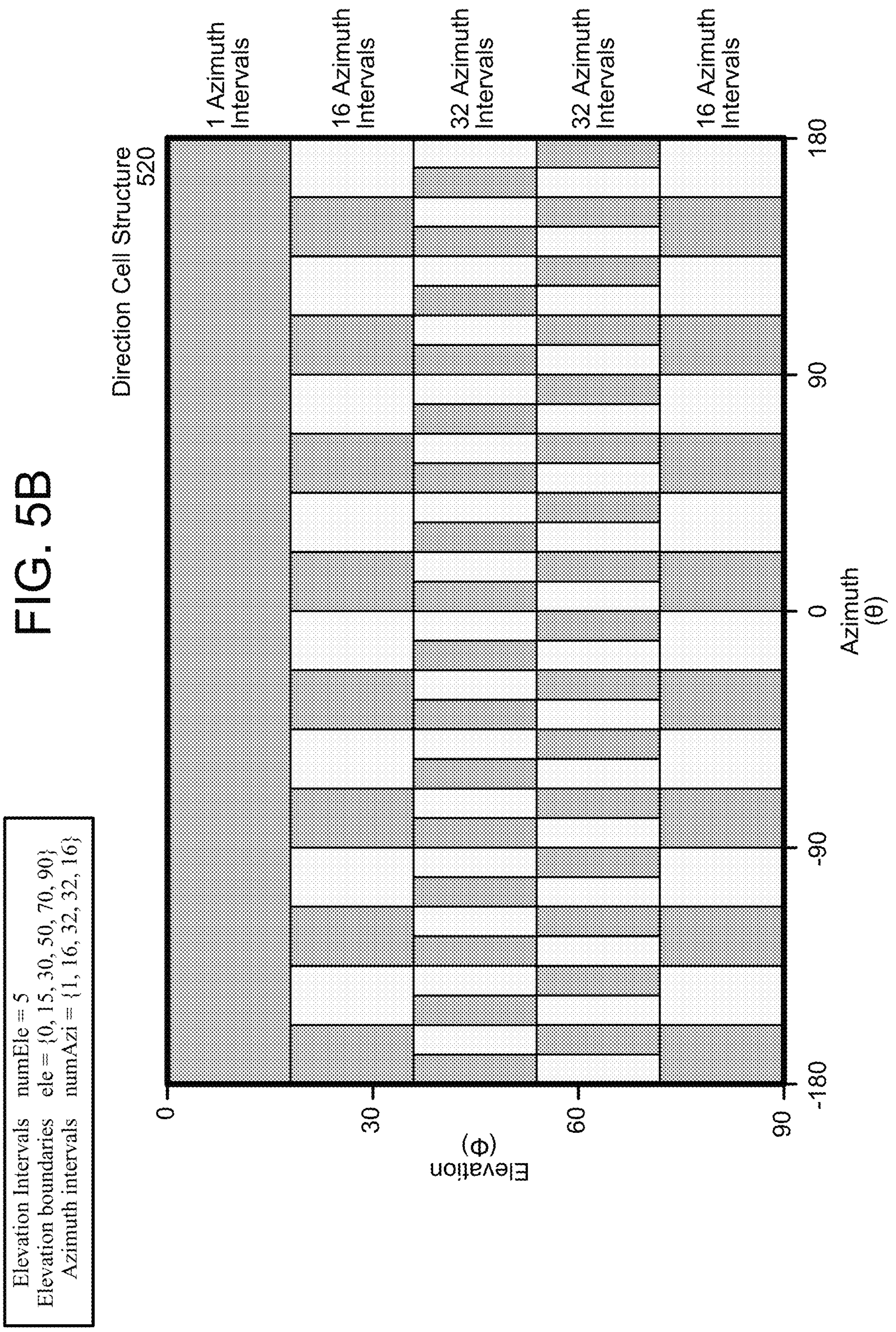

FIGS. 5A-5B illustrate examples of direction cell structure according to examples of the present disclosure. As illustrated in FIG. 5A, first direction cell structure 510 illustrates an example of partitioning the space similar to the uniform division example described above. For example, the elevation range extends from a minimum elevation (e.g., $\phi_{min}$=0°) to a maximum elevation (e.g., $\phi_{max}$=90°) and the first direction cell structure 510 divides the elevation range into three elevation intervals (e.g., numEle=3) having uniform elevation boundaries (e.g., ele={0, 30, 60, 90}). In addition, the azimuth range extends from a minimum azimuth (e.g., $\theta_{min}$=−180°) to a maximum azimuth (e.g., $\theta_{max}$=180°), and the first direction cell structure 510 divides the azimuth range into a number of azimuth divisions given for each elevation. For example, the first direction cell structure 510 divides a first elevation interval into 8 direction cells (e.g., azimuth divisions), a second elevation interval into 16 direction cells, and a third elevation interval into 32 direction cells (e.g., numAzi={8, 16, 32}). This results in a total of 56 direction cells, but the number of candidate direction vectors included in each direction cell may vary. While FIG. 5A illustrates an example of a direction cell structure with uniform elevation intervals, the disclosure is not limited thereto and the device 110 may partition the space using different numbers of elevation intervals, azimuth divisions, and/or the like without departing from the disclosure.

As illustrated in FIG. 5B, second direction cell structure 520 illustrates an example of partitioning the space similar to the non-uniform division example described above. For example, the second direction cell structure 520 divides the elevation range into five elevation intervals (e.g., numEle=5) having non-uniform elevation boundaries (e.g., ele={0, 15, 30, 50, 70, 90}). In addition, the second direction cell structure 520 divides the azimuth range into a number of azimuth divisions given for each elevation. For example, the second direction cell structure 520 divides a first elevation interval into 1 direction cell (e.g., azimuth division), a second elevation interval into 16 direction cells, a third elevation interval into 32 direction cells, a fourth elevation interval into 32 direction cells, and a fifth elevation interval into 16 direction cells (e.g., numAzi={1, 16, 32, 32, 16}). This results in a total of 97 direction cells with smaller variations in the number of candidate direction vectors included in each direction cell than the previous examples. However, the disclosure is not limited thereto and the device 110 may partition the space using different numbers of elevation intervals, azimuth divisions, and/or the like without departing from the disclosure.

Once the device 110 defines the direction cell structure, each direction cell may be associated with boundaries specified by an azimuth range (e.g., aziMin to aziMax) and an elevation range (e.g., eleMin to eleMax). Thus, an individual direction cell (e.g., data record) represents a position range relative to the microphone array, such as a small partition of the direction space (e.g., segment of the environment as viewed from the device 110). For example, a first direction cell (e.g., first data record) may correspond to a first position range extending from a first azimuth (e.g., $\text{aziMin}_0$) to a second azimuth (e.g., $\text{aziMax}_0$) and from a first elevation (e.g., $\text{eleMin}_0$) to a second elevation (e.g., $\text{eleMax}_0$), a second direction cell (e.g., second data record) may correspond to a second position range extending from the second azimuth (e.g., $\text{aziMin}_1$) to a third azimuth (e.g., $\text{aziMax}_1$) and from the first elevation (e.g., $\text{eleMin}_1$) to the second elevation (e.g., $\text{eleMax}_1$), and so on.

In addition, as the device 110 defines the direction cell structure by splitting the elevation range into elevation intervals and dividing each elevation interval into a fixed number of azimuth divisions, each direction cell within an elevation interval may have a uniform size position range. For example, a first size of the first position range corresponding to the first direction cell described above is equal to a second size of the second position range corresponding to the second direction cell, as the first position range and the second position range have the same azimuth width and elevation height. However, the position ranges only have a uniform size within each elevation interval, as a number of azimuth divisions may vary between elevation intervals.

After defining the direction cells (e.g., determining the direction cell structure), the device 110 may determine neighboring direction cells for each of the direction cells, as the neighboring cells are required to determine power peak location(s) where a peak power level is highest among all of the neighboring direction cells.

Due to the way that the device 110 defined the direction cell structure, the direction cells are rectangular shaped with an azimuth width that is an integer multiple of top/bottom neighbors, which enables the device 110 to determine neighboring direction cells. For example, if the neighboring direction cells are at the same elevation (e.g., included in a single elevation interval), the device 110 may determine whether two direction cells share the same left or right azimuth boundary. If the neighboring direction cells are at different elevations (e.g., included in different elevation intervals), the device 110 may determine whether two direction cells share the same top or bottom elevation boundary, and then determine whether the azimuth interval of one direction cell is contained in the azimuth interval of a second direction cell. However, this is intended to conceptually illustrate an example and the disclosure is not limited thereto.

To apply the codebook in direction finding, the device 110 may calculate power values at all directions and locate peaks caused by prominent acoustic activities. For example, the device 110 may detect a number of peaks (e.g., local maxima) represented in the power values and identify a portion of the peaks (e.g., peaks that exceed a threshold value) as sound sources.

To determine the average power values, the device 110 may determine direction cell data that indicates the direction vectors associated with each direction cell. In some examples, the device 110 may determine the candidate direction vectors associated with a particular direction cell and may store an indication of the specific candidate direction vectors and/or an association between the specific candidate direction vector and the direction cell. However, the disclosure is not limited thereto, and in other examples the device 110 may determine the candidate direction vectors associated with a particular direction cell and store an indication of (i) the TDOA index(es) associated with the direction cell and (ii) the exact number of candidate direction vectors associated with each TDOA index. For example, the device 110 may generate direction cell data that indicates a pair {index, count} for each TDOA index associated with the direction cell.

The TDOA index is used to address one vector inside the set of candidate direction vectors, and the count corresponds to a weight that the device 110 may apply to the power value associated with that TDOA index. As the TDOA index has a 1:1 correspondence to a clustered direction vector, the device 110 may determine the clustered direction vector(s) associated with the direction cell and the exact number of candidate direction vectors associated with each of the clustered direction vector(s) without departing from the disclosure.

To illustrate an example, the device 110 may store information unique to a first direction cell in a portion of the direction cell data (e.g., dirIndexCount[i]) associated with the first direction cell. During initialization, the device 110 may check each candidate direction vector with known direction (e.g., {azimuth, elevation}) to see whether it is inside the boundaries of a particular direction cell. For example, if the candidate direction vector is inside the boundaries of the first direction cell, the device 110 may determine a TDOA index (e.g., first index $TDOA_0$) associated with the candidate direction vector and determine whether the TDOA index is stored in the portion of the direction cell data (e.g., dirIndexCount[i]). If the TDOA index is not stored in the portion of the direction cell data (e.g., dirIndexCount[i] does not include first index $TDOA_0$), the device 110 may add the TDOA index with a count value of one (e.g., {TDOA0, 1}). If the TDOA index is already stored in the portion of the direction cell data (e.g., dirIndexCount[i] includes $TDOA_0$), the device 110 may increment the count associated with the TDOA index (e.g., {TDOA0, 2}).

After performing an initialization process by repeating this operation for each of the candidate direction vectors and each of the direction cells, the device 110 may generate direction cell data that includes the pair {index, count} for each TDOA index associated with each direction cell of the plurality of direction cells. In some examples, the device 110 may determine a total count value for each direction cell by summing the respective count values for each of the TDOA indexes associated with the direction cell. For example, if the first direction cell is associated with four TDOA indexes, the device 110 may determine the total count value for the first direction cell by summing the four count values associated with the four TDOA indexes. Additionally or alternatively, the device 110 may determine a normalization factor for the first direction cell by taking a reciprocal of the total count value. For example, if the total count value is equal to X, the normalization factor is equal to 1/X.

Using the direction cell data, the device 110 may determine the average power value for the first direction cell. For example, the device 110 may determine a first power value associated with a first TDOA index, may determine that the first TDOA index is associated with the first direction cell, and may determine a first count value corresponding to the first TDOA index (e.g., {index, count} indicates first TDOA index and first count value). To determine the average power value for the first direction cell, the device 110 may multiply the first power value by the first count value to determine a first product. Similarly, the device 110 may determine second TDOA indexes associated with the first direction cell, multiply second power values for each of the second TDOA indexes with corresponding count values to determine second products, and determine a sum of the first product and the second products to determine a total power value for the first direction cell. Finally, the device 110 may multiply the total power value by the normalization factor (or divide the total power value by the total count value) to determine an average power value associated with the first direction cell.

Figure 6:
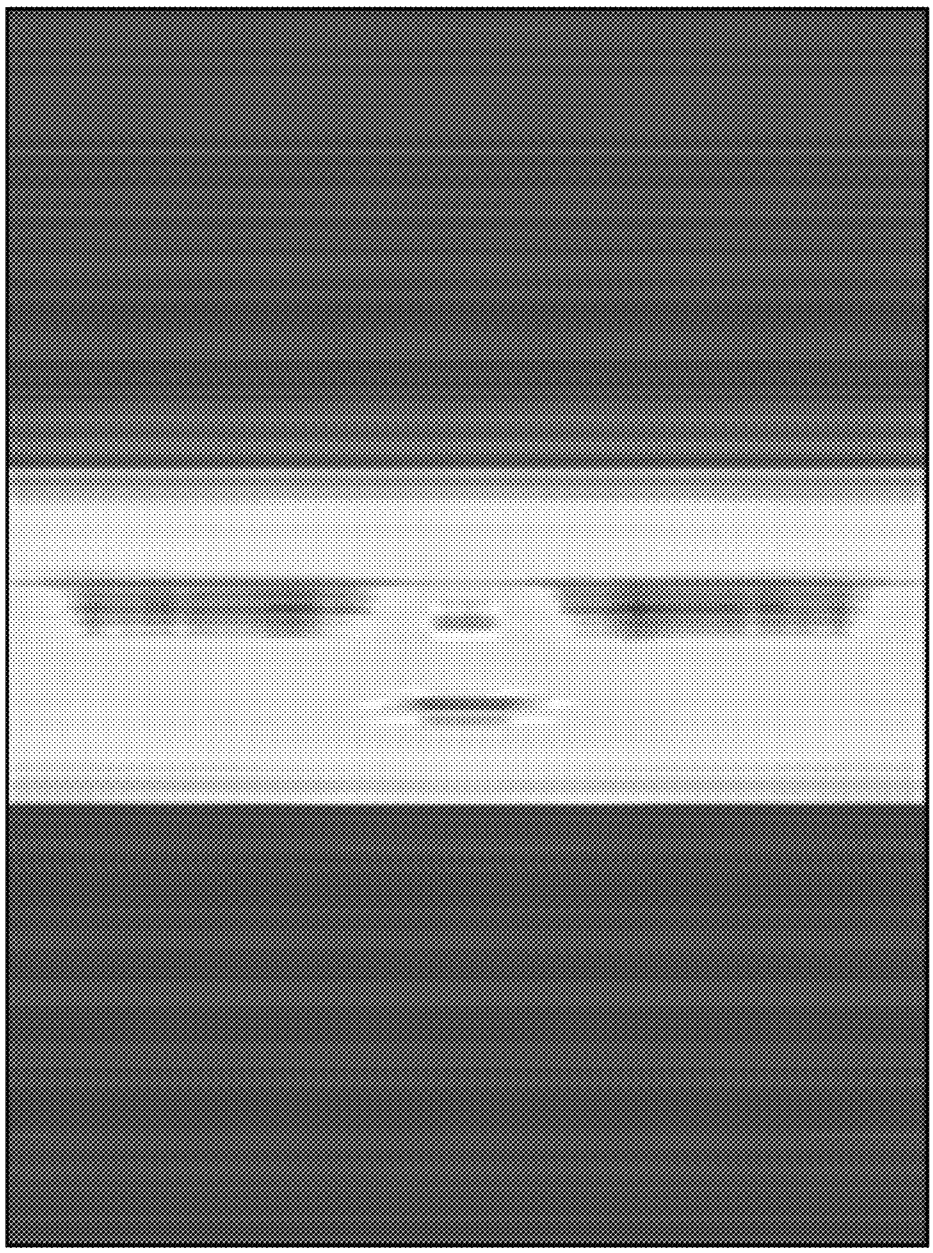
FIG. 6 illustrates an example of generating average power data representing azimuth over time according to embodiments of the present disclosure.

FIG. 6 illustrates an example of generating average power data representing azimuth over time according to embodiments of the present disclosure. In some examples, the device 110 may determine average power data using only azimuth values. For example, the device 110 may only care about the azimuth of the sound sources and may determine the average power values without regard to the elevation values. Thus, the device 110 may provide the number of desired cells (e.g., numCells), together with boundary values of the elevation (e.g., eleMin to eleMax). The device 110 may exclude direction vectors with elevation values that are out of bound (e.g., not included between the eleMin and the eleMax) and determine the average power values for the number of desired cells.

FIG. 6 illustrates an example of average power data (azimuth-only) 610 for a period of time, during which a user says a keyword in a quiet environment. As illustrated in FIG. 6, the power values of the direction cells increases when the user starts to utter the word, and it reaches a peak and subsequently declines. The distribution of power suggests strong directionality with dominant direction near azimuth 0 (e.g., location of the user). Thus, analyzing the average power data (average-only) 610 gives the device 110 insight toward the timing of a strong acoustic event, as well as its direction.

Figure 7:
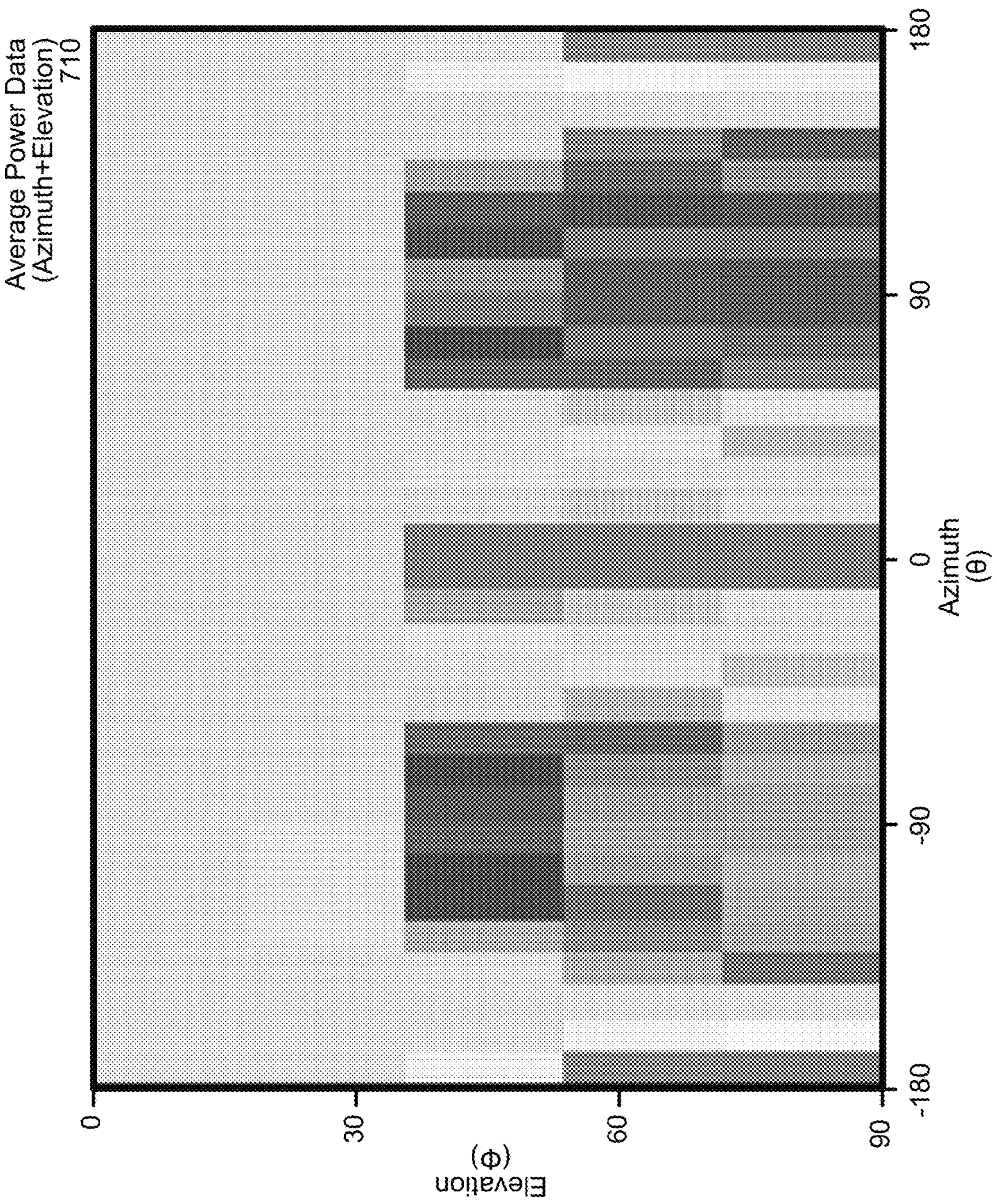
FIG. 7 illustrates an example of generating average power data representing azimuth and elevation according to embodiments of the present disclosure.

FIG. 7 illustrates an example of generating average power data representing azimuth and elevation according to embodiments of the present disclosure. In some examples, the device 110 may determine average power data using a combination of azimuth values and elevation values. For example, the device 110 may partition the direction space such that the elevation range is split into elevation intervals, as described in greater detail above. Thus, the device 110 may define the direction cell structure by determining a number of elevation intervals, elevation boundaries associated with the elevation intervals, and/or a number of azimuth divisions for each elevation interval. FIG. 7 illustrates an example of average power data (azimuth and elevation) 620 for a single audio frame (e.g., brief moment in time). The device 110 may analyze the average power data to identify a number of sound source(s) and/or location(s) of the sound source(s). Thus, the device 110 may analyze the average power data to gain insight toward the most likely directions of the sound source based on the azimuth and/or elevation associated with the peak power values.

Figure 8:
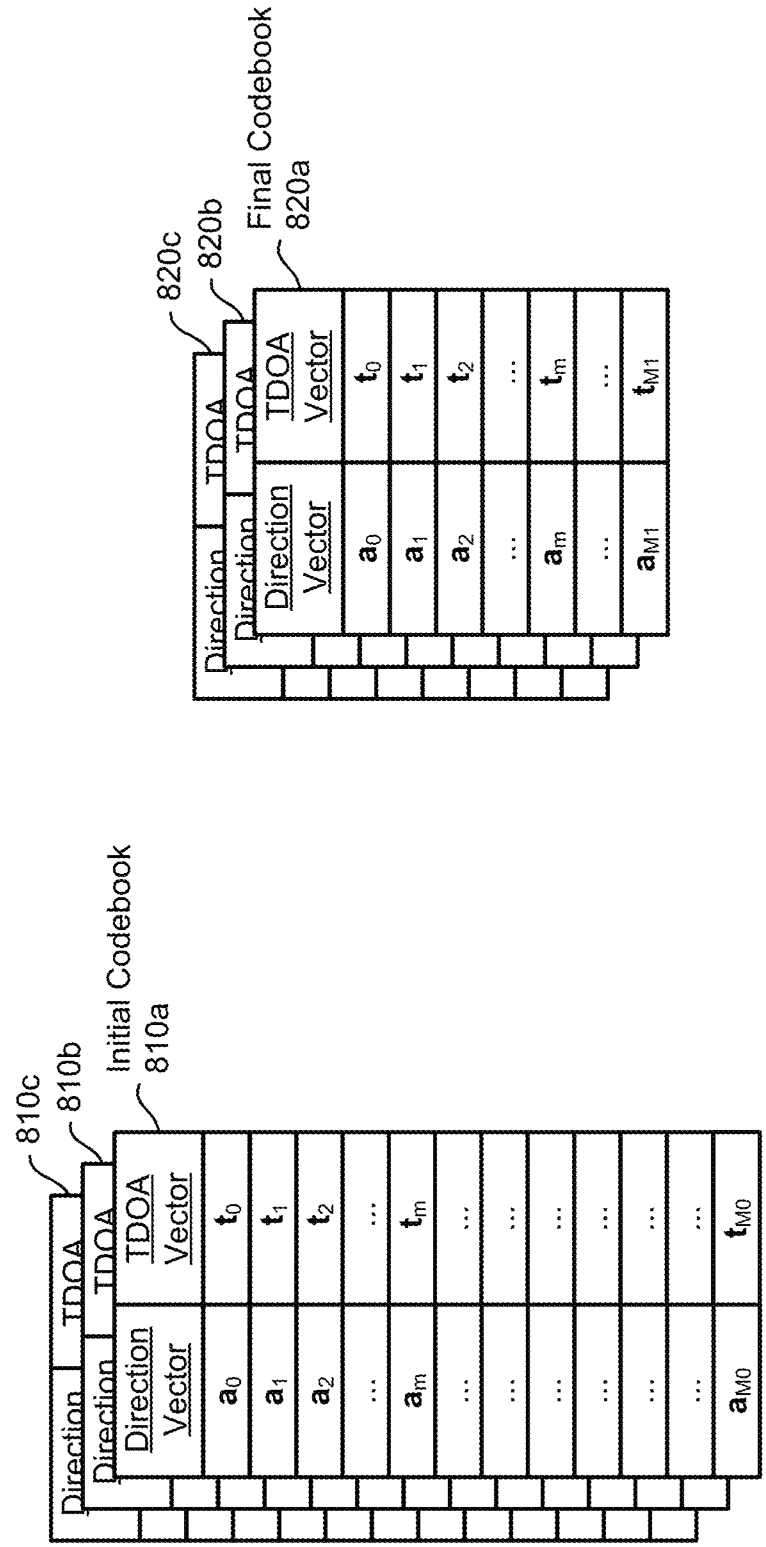
FIG. 8 illustrates examples of delay-direction codebooks according to embodiments of the present disclosure.

FIG. 8 illustrates examples of delay-direction codebooks according to embodiments of the present disclosure. As illustrated in FIG. 8, the device 110 may generate and/or store one or more initial codebooks 810. For example, the device 110 may store a first initial codebook 810*a*, a second initial codebook 810*b*, and a third initial codebook 810*c*, although the disclosure is not limited thereto. As described in greater detail above, the initial codebooks may include a set of $M_0$ candidate direction vectors and a set of $M_0$ TDOA vectors. For example, a first candidate direction vector $a_0$ may correspond to a first TDOA vector to (e.g., first delay vector data), a second candidate direction vector $a_1$ may correspond to a second TDOA vector $t_1$ (e.g., second delay vector data), and so on, such that an m-th candidate direction vector $a_m$ corresponds to an m-th TDOA vector $t_m$ (e.g., m-th delay vector data) for each of the $M_0$ candidate direction vectors. Thus, a size of the initial codebook 810 is limited by the $M_0$ candidate direction vectors, and an individual TDOA vector may be included in the initial codebook 810 multiple times (e.g., associated with multiple candidate direction vectors).

As described above with regard to FIG. 3, a TDOA vector $t_m$ may contain P elements (k=0 to P−1), where P corresponds to the number of microphone pairs calculated using Equation [2]. For example, the kth element ($\tau_{m,k}$) of the TDOA vector $t_m$ contains a time delay between the microphones at index0[k] and index1[k]. In the example illustrated in FIG. 3, the device 110 estimates the time delay $\tau_{m,k}$ used to generate the TDOA vector $t_m$. During normal operation, however, the device 110 may measure the time delay $\tau_{m,k}$ without departing from the disclosure.

To illustrate an example, the device 110 may generate audio data that includes individual channels for each microphone included in the microphone array. By identifying when a particular audible sound is represented in each channel, the device 110 may measure a corresponding time delay $\tau_{m,k}$ between each pair of microphones. For example, the first TDOA vector to (e.g., first delay vector data) may include a first time delay between (i) receipt, by a first microphone, of audio output by a first sound source and (ii) receipt of the audio by a second microphone. Similarly, the first TDOA vector may include a second time delay between (i) receipt of the audio by the first microphone and (ii) receipt of the audio by a third microphone.

By performing clustering and/or other processing, the device 110 may generate and/or store one or more final codebooks 820. For example, the device 110 may store a first final codebook 820*a*, a second final codebook 820*b*, and a third final codebook 820*c*, although the disclosure is not limited thereto. As described in greater detail above, the final codebooks may include a set of $M_1$ clustered direction vectors and a set of $M_1$ unique TDOA vectors. For example, a first clustered direction vector $a_0$ (e.g., centroid direction vector) may correspond to a first TDOA vector to (e.g., first delay vector data), a second clustered direction vector $a_1$ may correspond to a second TDOA vector $t_1$ (e.g., second delay vector data), and so on, such that an m-th clustered direction vector $a_m$ corresponds to an m-th TDOA vector $t_m$ (e.g., m-th delay vector data) for each of the $M_1$ clustered direction vectors.

As illustrated in FIG. 8, a size of the final codebook 820 is limited by the $M_1$ unique TDOA vectors, causing the final codebook 820 to be smaller than the initial codebook 810 (e.g., $M_0>M_1$). In addition, the final codebook 820 exhibits a 1:1 correspondence between the $M_1$ clustered direction vectors and the $M_1$ unique TDOA vectors, such that each clustered direction vector corresponds to a single TDOA vector and each TDOA vector corresponds to a single clustered direction vector. Thus, as there are no redundant entries included in the final codebook 820, performing clustering to generate the final codebook 820 may reduce a computational complexity associated with performing sound source localization.

FIG. 9 illustrates examples of direction cell data according to embodiments of the present disclosure. As illustrated in FIG. 9, in some examples the device 110 may store first direction cell data 910 that includes a variety of information associated with the direction cell without departing from the disclosure. For example, the first direction cell data 910 may include azimuth boundaries (e.g., aziMin and aziMax) and elevation boundaries (e.g., eleMin and eleMax) for each of the direction cells.

As used herein, the azimuth boundaries and/or the elevation boundaries may represent a position range associated with the direction cell (e.g., data record). Thus, an individual direction cell (e.g., data record) corresponds to a position range relative to the microphone array, such as a small partition of the direction space (e.g., segment of the environment as viewed from the device 110). For example, a first direction cell (e.g., first data record) may correspond to a first position range extending from a first azimuth (e.g., $aziMin_0$) to a second azimuth (e.g., $aziMax_0$) and from a first elevation (e.g., $eleMin_0$) to a second elevation (e.g., $eleMax_0$), a second direction cell (e.g., second data record) may correspond to a second position range extending from the second azimuth (e.g., $aziMin_1$) to a third azimuth (e.g., $aziMax_1$) and from the first elevation (e.g., $eleMin_1$) to the second elevation (e.g., $eleMax_1$), and so on.

In addition, as the device 110 defines the direction cell structure by splitting the elevation range into elevation intervals and dividing each elevation interval into a fixed number of azimuth divisions, each direction cell within an elevation interval may have a uniform size position range. For example, a first size of the first position range corresponding to the first direction cell described above is equal to a second size of the second position range corresponding to the second direction cell, as the first position range and the second position range have the same azimuth width and elevation height. However, the position ranges only have a uniform size within each elevation interval, as a number of azimuth divisions may vary between elevation intervals.

Additionally or alternatively, the first direction cell data 910 may include a normalization factor (e.g., invTotalCount) for each direction cell as well as index(es) (e.g., index values) and count(s) (e.g., count values) for each TDOA index associated with the direction cell. For example, the first direction cell ("0") may include a first plurality of indexes and corresponding counts, the second direction cell ("1") may include a second plurality of indexes and corresponding counts, and so on. As described above, the device 110 may determine the indexes and/or counts based on a plurality of candidate direction vectors associated with each direction cell.

In other examples, the device 110 may store second direction cell data 920 that does not include the azimuth boundaries and the elevation boundaries associated with each direction cell without departing from the disclosure. For example, the second direction cell data 920 may include the normalization factor (e.g., invTotalCount) for each direction cell as well as index(es) (e.g., index values) and count(s) (e.g., count values) for each TDOA index associated with the direction cell without departing from the disclosure.

While the first direction cell data 910 and the second direction cell data 920 illustrate examples in which the device 110 stores the index(es) and the count(s) separately, the disclosure is not limited thereto. Instead, the device 110 may store one or more pairs (e.g., {index, count}) for each direction cell, with each pair indicating a TDOA index and corresponding count value associated with the direction cell, as illustrated by example direction cell 930.

As used herein, a plurality of direction cells may be referred to as a plurality of data records without departing from the disclosure. As illustrated in FIGS. 5A-5B, the direction cell structures 510/520 represent a visual illustration (e.g., graphical representation) of the plurality of direction cells and corresponding position ranges. For example, the direction cell structures 510/520 partition the direction space using regular structure (e.g., predetermined uniformity and/or symmetry), dividing the azimuth range [−180° to 180° ] and the elevation range [00 to 90° ] into the plurality of direction cells with corresponding position ranges illustrated relative to the overall direction space.

In contrast, the direction cell data 910/920 depicted in FIG. 9 is a tabular representation of the direction cells, with each parameter (e.g., boundary value, index value, count value, etc.) associated with a direction cell represented as an individual entry in a single data record. For example, each direction cell is represented in the direction cell data 910 by a corresponding data record, with a first entry indicating the direction cell index (e.g., Direction Cell), a second entry indicating a minimum azimuth (e.g., aziMin), a third entry indicating a maximum azimuth (e.g., aziMax), a fourth entry indicating a minimum elevation (e.g., eleMin), a fifth entry indicating a maximum elevation (e.g., eleMax), a sixth entry indicating a TDOA index value (e.g., Index), a seventh entry indicating a count value (e.g., Count), and an eighth entry indicating a normalization factor (e.g., invTotalCount), although the disclosure is not limited thereto. Thus, a plurality of data records represents all of the information associated with a plurality of direction cells and there is a 1:1 correspondence between an individual data record and an individual direction cell.

Figure 10:
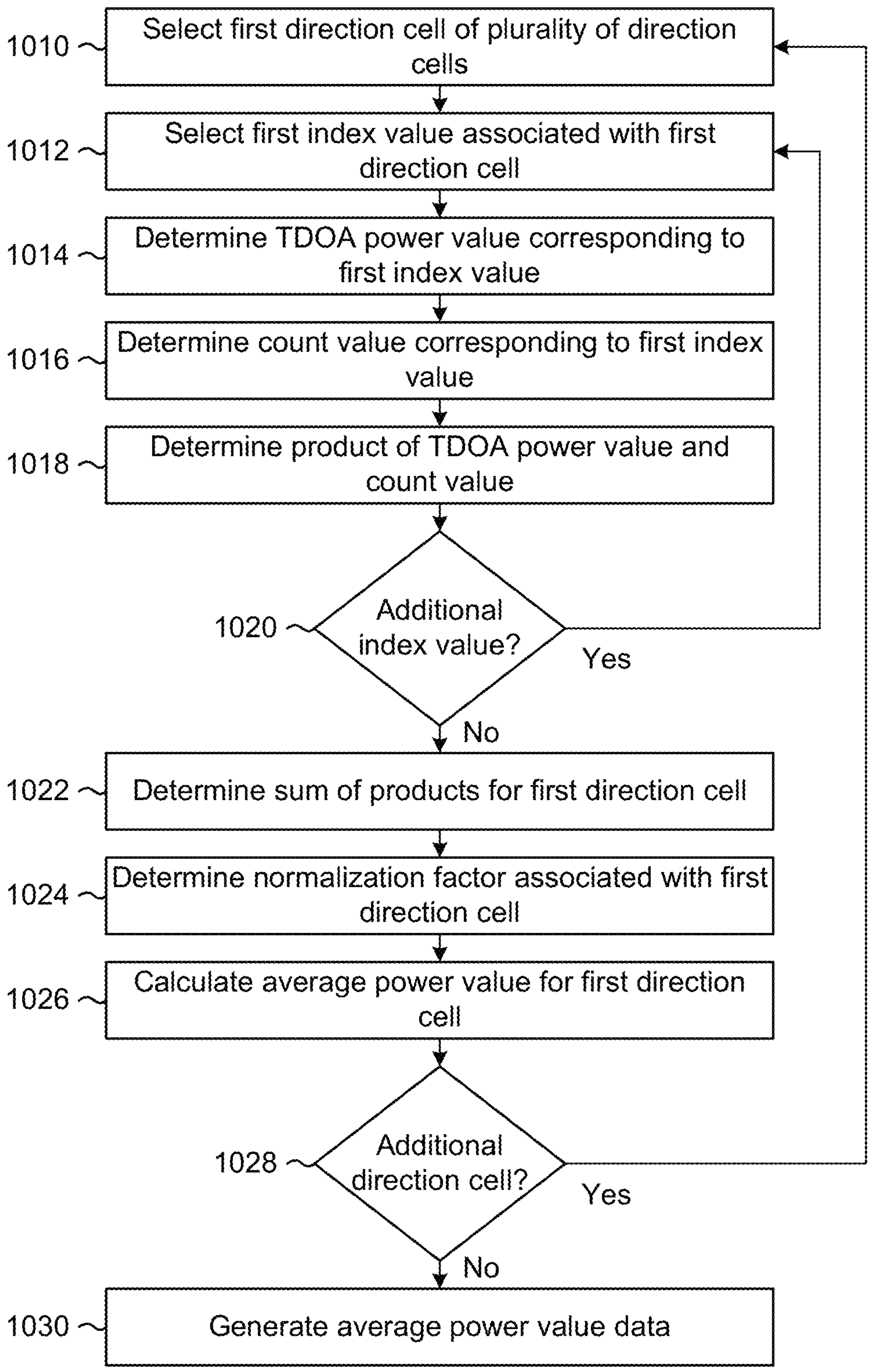
FIG. 10 is a flowchart illustrating an example method for calculating average power values using direction cell data according to embodiments of the present disclosure.

FIG. 10 is a flowchart illustrating an example method for calculating average power values using direction cell data according to embodiments of the present disclosure. As illustrated in FIG. 10, the device 110 may select (1010) a first direction cell of a plurality of direction cells and may select (1012) a first index value associated with the first direction cell. Using the first index value, the device 110 may determine (1014) a TDOA power value corresponding to the first index value, may determine (1016) a count value corresponding to the first index value, and may determine (1018) a product of the TDOA power value and the count value.

The device 110 may determine (1020) if there is an additional index value associated with the first direction cell and, if so, may loop to step 1012 and repeat steps 1012-1018 for the additional index value. If there is not an additional index value, the device 110 may determine (1022) a sum of products for the first direction cell, may determine (1024) a normalization factor associated with the first direction cell, and may calculate (1026) an average power value for the first direction cell.

The device 110 may determine (1028) whether there is an additional direction cell and, if so, may loop to step 1010 and repeat steps 1010-1026 for the additional direction cell. If there is not an additional direction cell, the device 110 may generate (1030) average power value data using the average power values calculated in step 1026 for each of the direction cells.

Figure 11:
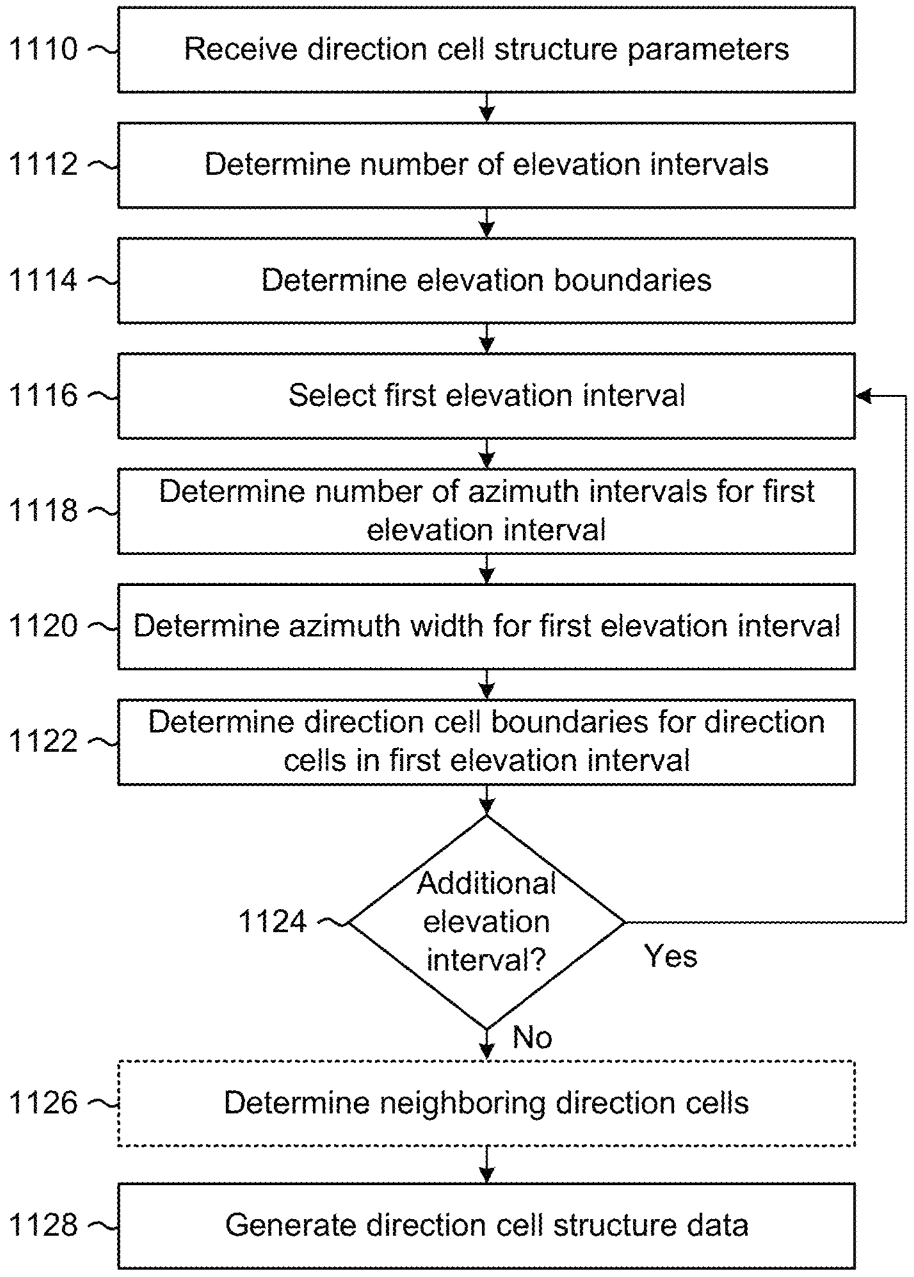
FIG. 11 is a flowchart illustrating an example method for generating direction cell structure data according to embodiments of the present disclosure.

FIG. 11 is a flowchart illustrating an example method for generating direction cell structure data according to embodiments of the present disclosure. As illustrated in FIG. 11, the device 110 may receive (1110) direction cell structure parameters, may determine (1112) a number of elevation intervals, and may determine (1114) elevation boundaries between the number of elevation intervals. For example, the device 110 may determine whether the elevation intervals will have uniform sizes or non-uniform sizes and may set elevation boundaries correspondingly.

The device 110 may select (1116) a first elevation interval, may determine (1118) a number of azimuth intervals for the first elevation interval, may determine (1120) an azimuth width for the first elevation interval based on the number of azimuth intervals, and may determine (1122) direction cell boundaries for direction cells in the first elevation interval.

The device 110 may determine (1124) whether there is an additional elevation interval, and, if so, may loop to step 1116 and repeat steps 1116-1122 for the additional elevation interval. If there is not an additional elevation interval, the device 110 may optionally determine (1126) neighboring direction cells for each of the direction cells and may generate (1128) direction cell structure data representing the direction cell boundaries, neighboring direction cells, and/or additional information.

Figure 12A:
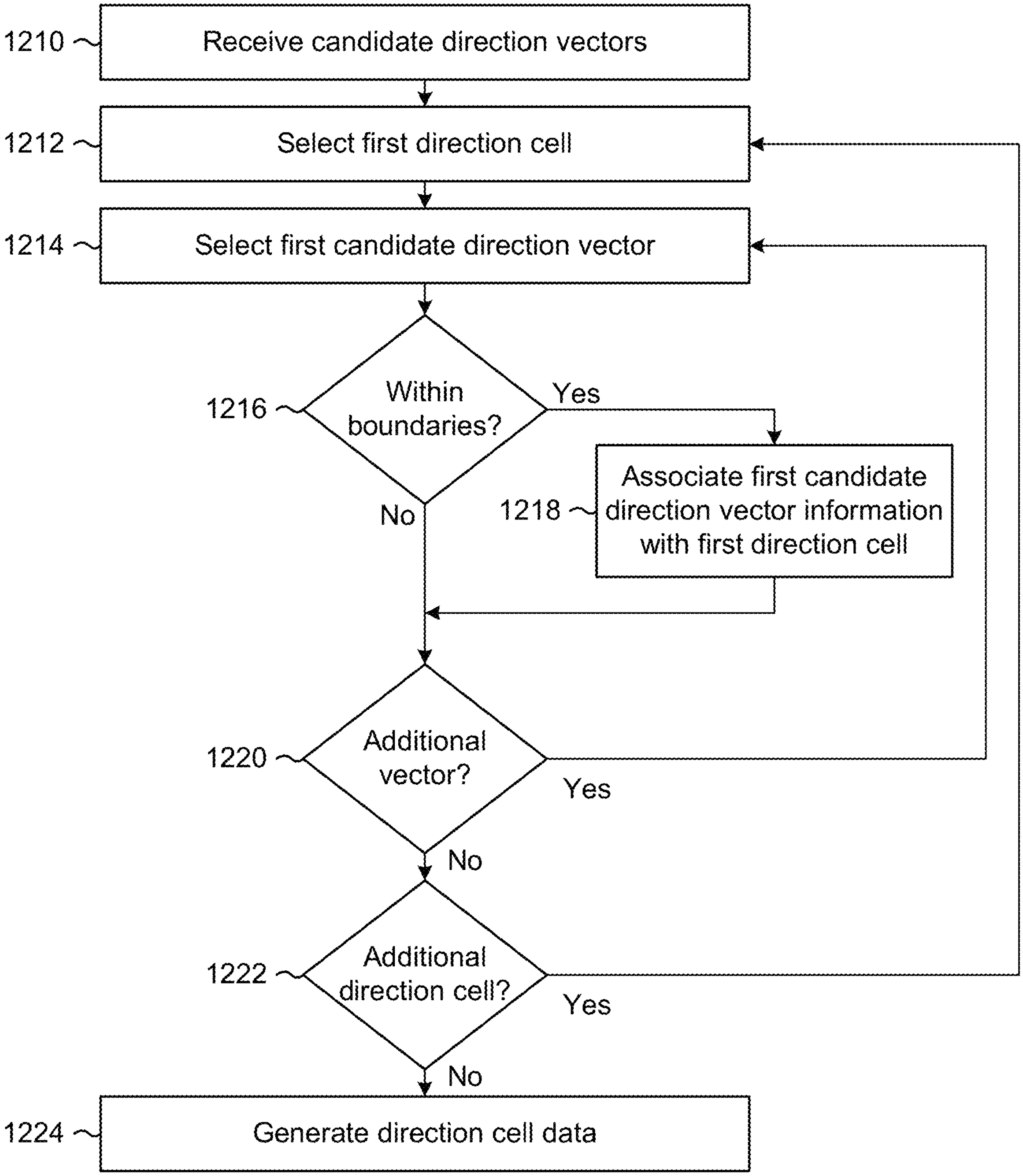
FIGS. 12A-12B are flowcharts illustrating example methods for generating direction cell data according to embodiments of the present disclosure.
Figure 12B:
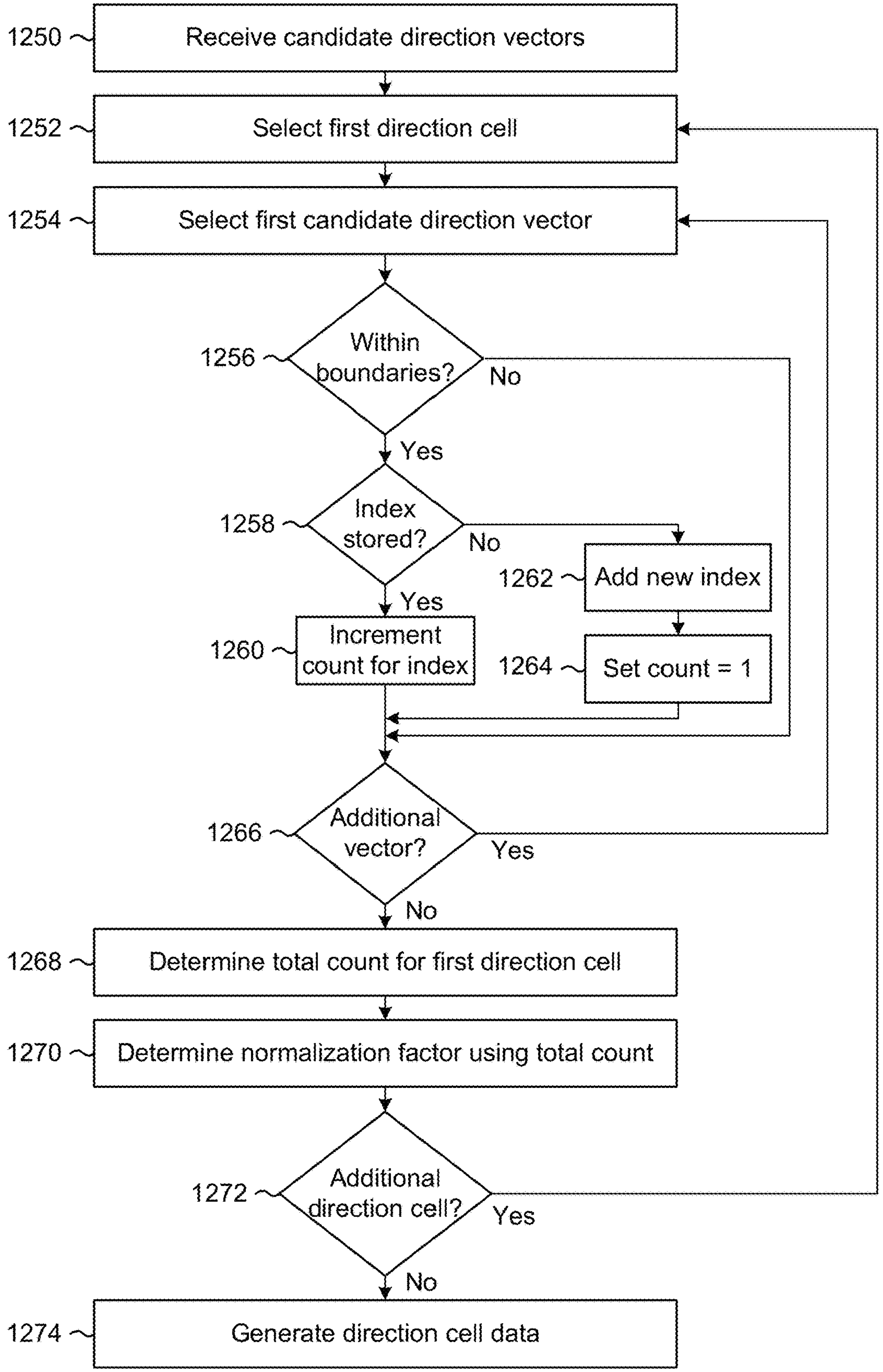

FIGS. 12A-12B are flowcharts illustrating example methods for generating direction cell data according to embodiments of the present disclosure. As illustrated in FIG. 12A, the device 110 may receive (1210) candidate direction vectors and may select (1212) a first direction cell of a plurality of direction cells. The device 110 may select (1214) a first candidate direction vector and may determine (1216) whether the first candidate direction vector is within boundaries associated with the first direction cell. If the first candidate direction vector is not within the boundaries associated with the first direction cell, the device 110 may skip to step 1220. However, if the first candidate direction vector is within the boundaries, the device 110 may associate (1218) first candidate direction vector information with the first direction cell.

The device 110 may determine (1220) whether there is an additional vector and, if so, may loop to step 1214 and repeat steps 1214-1218. If the device 110 determines that there is not an additional vector, the device 110 may determine (1222) whether there is an additional direction cell, and, if so, may loop to step 1212 and repeat steps 1212-1220 for the additional direction cell. If the device 110 determines that there is not an additional direction cell, the device 110 may generate (1224) direction cell data, as described in greater detail above.

As illustrated in FIG. 12B, the device 110 may receive (1250) candidate direction vectors and may select (1252) a first direction cell of a plurality of direction cells. The device 110 may select (1254) a first candidate direction vector and may determine (1256) whether the first candidate direction vector is within boundaries associated with the first direction cell. If the first candidate direction vector is not within the boundaries associated with the first direction cell, the device 110 may skip to step 1266. However, if the first candidate direction vector is within the boundaries, the device 110 may determine (1258) whether a TDOA index is stored and associated with the first direction cell. If the TDOA index is stored, the device 110 may increment (1260) a count associated with the TDOA index. If the TDOA index is not stored, the device 110 may add (1262) a new index and set (1264) a count value for the new TDOA index equal to a value of one.

The device 110 may determine (1266) whether there is an additional vector and, if so, may loop to step 1254 and repeat steps 1254-1264. If the device 110 determines that there is not an additional vector, the device 110 may determine (1268) a total count value associated with the first direction cell and may determine (1270) a normalization factor using the total count value. In some examples, the device 110 may determine a total count value for the first direction cell by summing the respective count values for each of the TDOA indexes associated with the direction cell. For example, if the first direction cell is associated with four TDOA indexes, the device 110 may determine the total count value for the first direction cell by summing the four count values associated with the four TDOA indexes. Additionally or alternatively, the device 110 may determine the normalization factor for the first direction cell by taking a reciprocal of the total count value. For example, if the total count value is equal to X, the normalization factor is equal to 1/X.

The device 110 may determine (1272) whether there is an additional direction cell, and, if so, may loop to step 1252 and repeat steps 1252-1270 for the additional direction cell. If the device 110 determines that there is not an additional direction cell, the device 110 may generate (1274) direction cell data, as described in greater detail above with regard to FIG. 9.

Figure 13A:
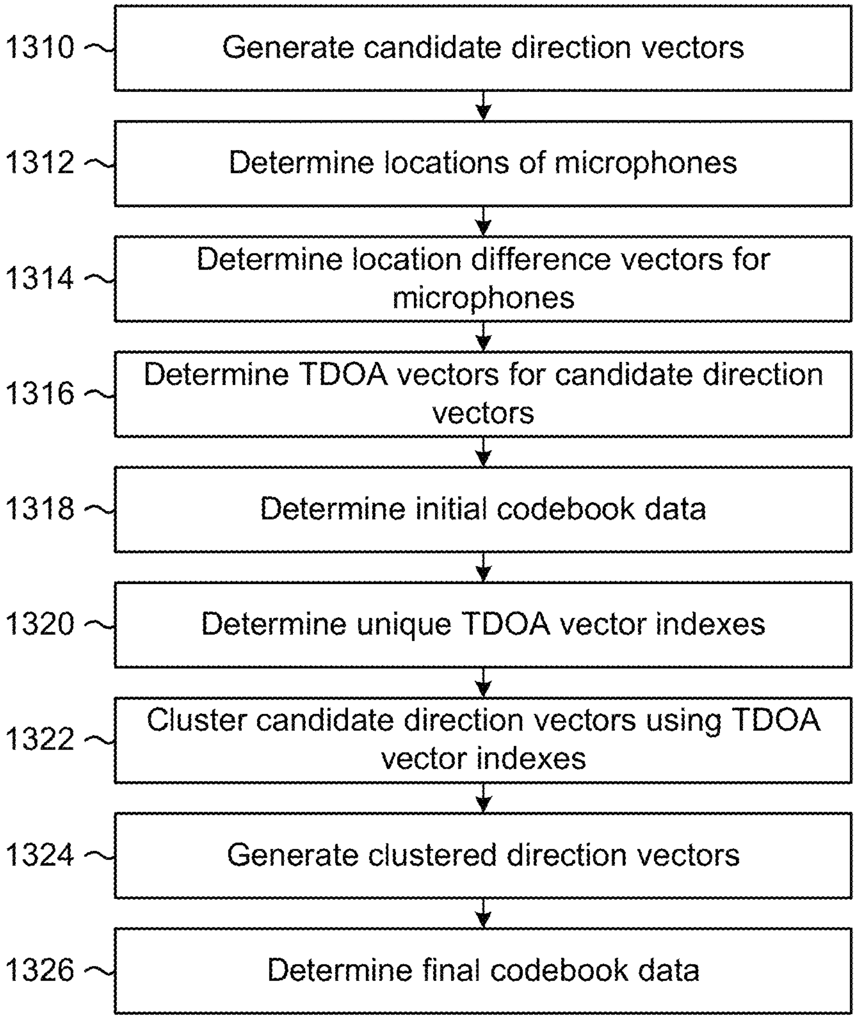
FIGS. 13A-13B are flowcharts illustrating example methods for generating delay-direction codebooks according to embodiments of the present disclosure.
Figure 13B:
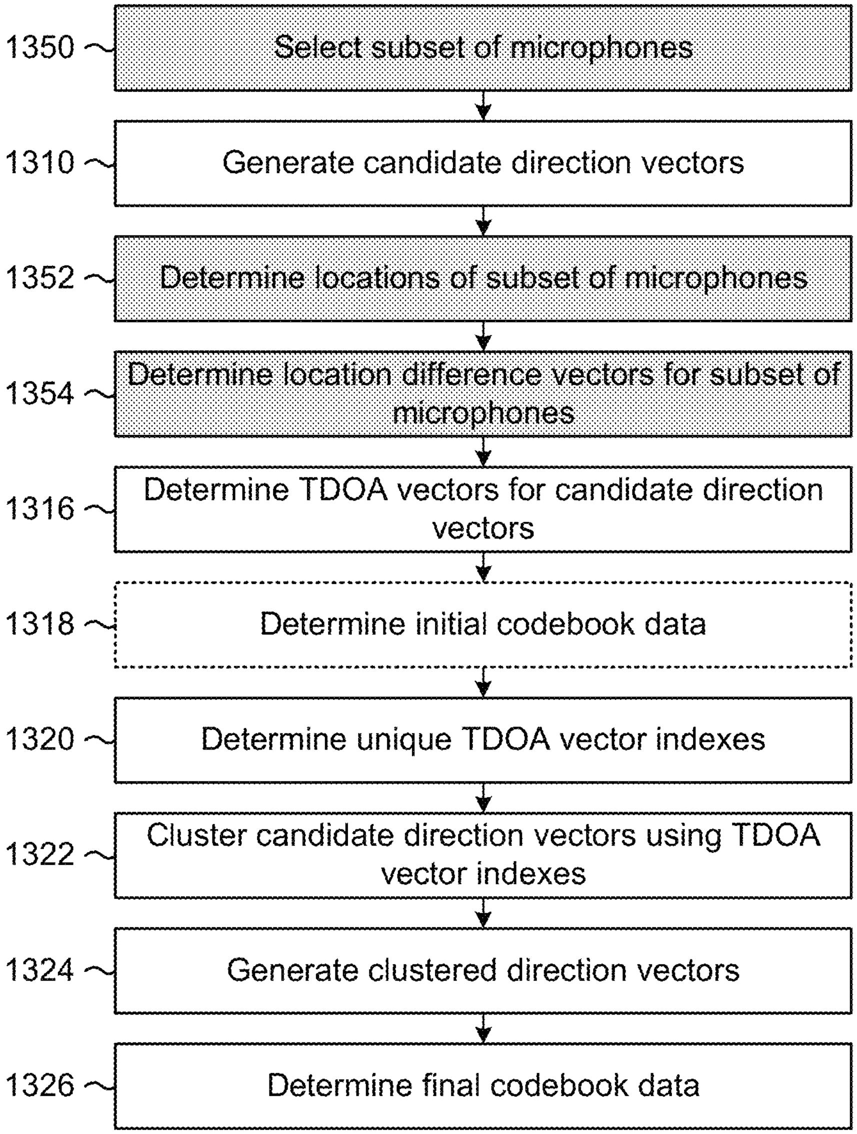

FIGS. 13A-13B are flowcharts illustrating example methods for generating delay-direction codebooks according to embodiments of the present disclosure. As illustrated in FIG. 13A, the device 110 may generate (1310) candidate direction vectors, determine (1312) locations of microphones, and determine (1314) location difference vectors for the microphones, as described in greater detail above with regard to FIG. 3.

The device 110 may determine (1316) TDOA vectors for the candidate direction vectors and determine (1318) initial codebook data. For example, the initial codebook may have size M. The device 110 may determine (1320) unique TDOA vector indexes, cluster (1322) the candidate direction vectors using TDOA vector indexes, generate (1324) clustered direction vectors, and determine (1326) final codebook data, as described above with regard to FIG. 3.

As illustrated in FIG. 13B, in some examples the device 110 may select (1350) a subset of microphones, generate (1310) candidate direction vectors, determine (1352) locations of the subset of microphones, and determine (1354) location difference vectors for the subset of microphones. The device 110 may then perform steps 1316-1326 as described above with regard to FIG. 13A. Thus, the device 110 may be configured to generate the initial and/or final codebook using a subset of the microphones without departing from the disclosure. For example, the device 110 may detect a microphone malfunction and regenerate the final codebook without the defective microphone.

Figure 14A:
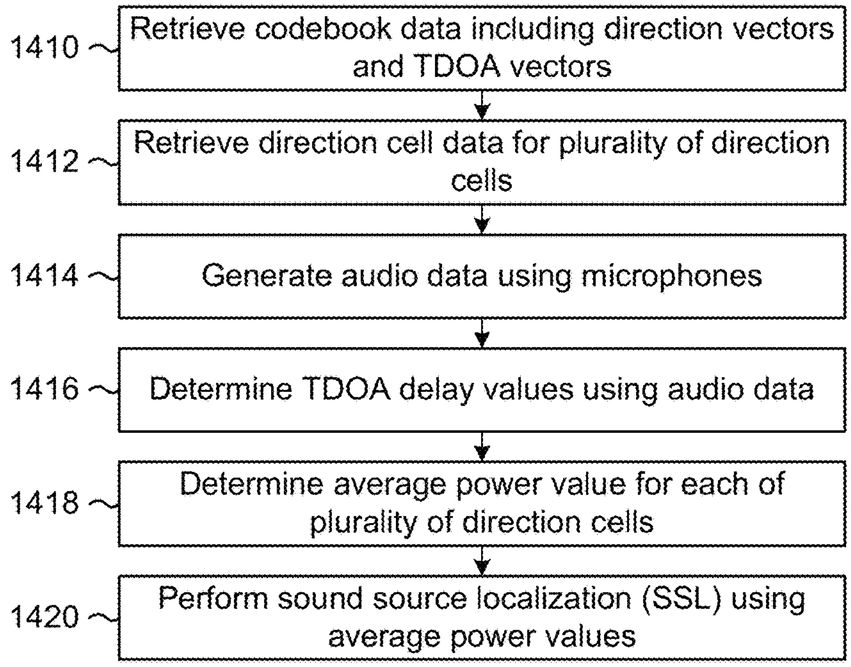
FIGS. 14A-14B are flowcharts illustrating example methods for determining average power values using fixed delay-direction codebooks or dynamically adjusted delay-direction codebooks according to embodiments of the present disclosure.
Figure 14B:
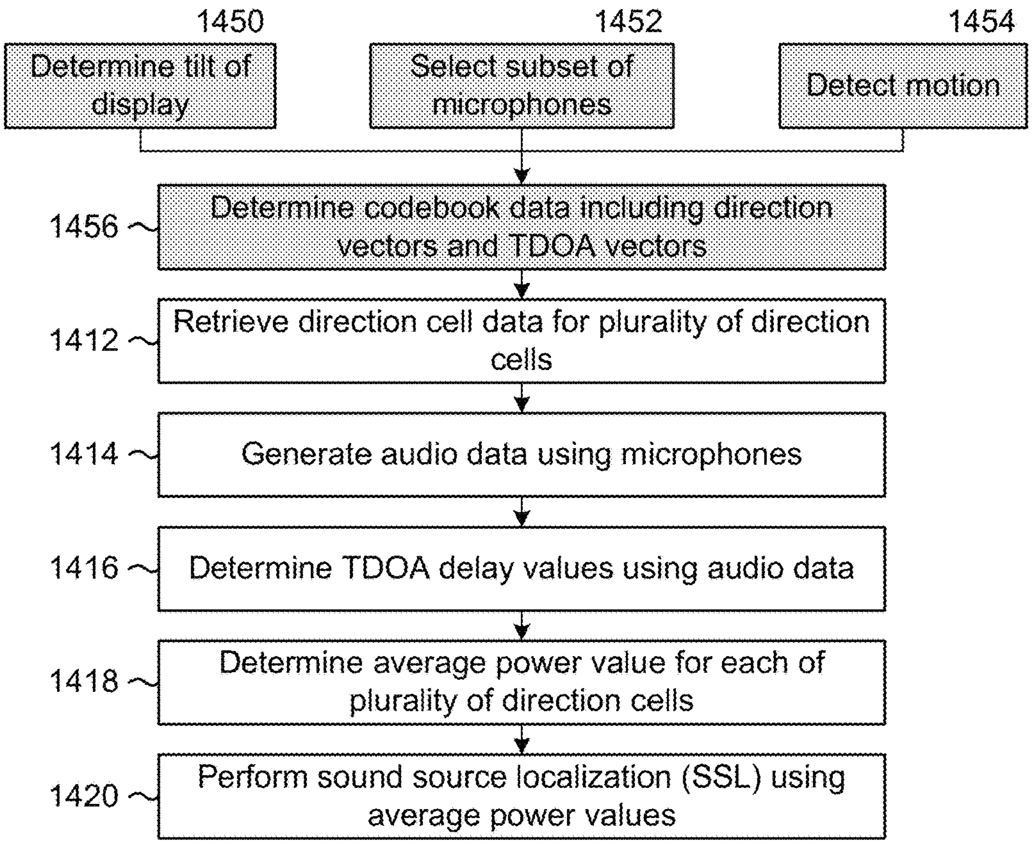

FIGS. 14A-14B are flowcharts illustrating example methods for determining average power values using fixed delay-direction codebooks or dynamically adjusted delay-direction codebooks according to embodiments of the present disclosure. As illustrated in FIG. 14A, the device 110 may retrieve (1410) codebook data including direction vectors and TDOA vectors and may retrieve (1412) direction cell data for a plurality of direction cells. The codebook data and/or the direction cell data may be generated previously by the device 110 and/or the remote device(s) 120 without departing from the disclosure.

The device 110 may generate (1414) audio data using microphones and may determine (1416) TDOA delay values using the audio data. For example, the device 110 may perform TDOA processing to determine TDOA delay values along with power value(s) associated with each sound source represented in the audio data.

Using the direction cell data and the TDOA delay values, the device 110 may determine (1418) an average power value for each of the plurality of direction cells. For example, the device 110 may use the codebook data to determine that first TDOA delay values correspond to a first TDOA index. Knowing the first TDOA index, the device 110 may use the direction cell data to determine that the first TDOA index corresponds to a first direction cell and determine a count value associated with the first TDOA index. The device 110 may then multiply the count value by a power value associated with the first TDOA index and repeat these steps for each of the other TDOA indexes associated with the first direction cell. After determining the average power values, the device 110 may perform (1420) sound source localization (SSL) using the average power values. For example, the device 110 may detect sound source(s) by identifying local peaks represented in the average power values and determining direction(s) associated with the local peaks.

While FIG. 14A illustrates an example in which the device 110 uses a fixed codebook, the disclosure is not limited thereto and in some examples the device 110 may dynamically select or adjust codebook data based on current conditions. For example, the device 110 may select different codebook data based on a tilt of a display of the device 110, based on a number of microphones, and/or based on motion.

In some examples, the microphone array may be fixed to the display of the device 110, and the display may be configured to tilt from a first tilt angle (e.g., screen vertical, or 0 degrees) to a second tilt angle (e.g., 65 degrees). As the display tilting also tilts the microphone array, the delay-direction codebook derived at the first tilt angle is not accurate at the second tilt angle. Thus, the device 110 may determine (1450) a tilt of the display (e.g., tilt angle) and may use this tilt angle to determine the codebook data.

In other examples, the device 110 may modify the codebook based on a desired number of microphones to use. For example, the device 110 may use a first number of microphones when the device 110 is stationary, but may use a second number of microphones when the device 110 is in motion (e.g., ignores microphones that capture movement noise). Additionally or alternatively, the device 110 may detect a microphone malfunction or otherwise determine to not use a microphone, which requires generating or selecting a different codebook. Thus, the device 110 may select (1452) a subset of microphones and/or detect (1454) motion.

The device 110 may determine (1456) codebook data including direction vectors and TDOA vectors, based on any of the inputs described above. For example, the device 110 may use a different codebook based on the tilt of the display, the subset of the microphones, whether motion is detected, and/or the like. The device 110 may then use this codebook to perform steps 1412-1420 described above.

In some examples, the device 110 may generate the codebook data in step 1456. For example, the device 110 may store a single codebook that includes direction vectors and TDOA vectors derived using the first number of microphones. If the device 110 detects that a microphone is not functioning properly, the device 110 may generate a replacement codebook that includes direction vectors and TDOA vectors derived using the second number of microphones and ignoring the defective microphone. However, the disclosure is not limited thereto, and in other examples the device 110 may select from multiple codebooks and/or perform adjustment to a reference codebook without departing from the disclosure.

Figure 15A:
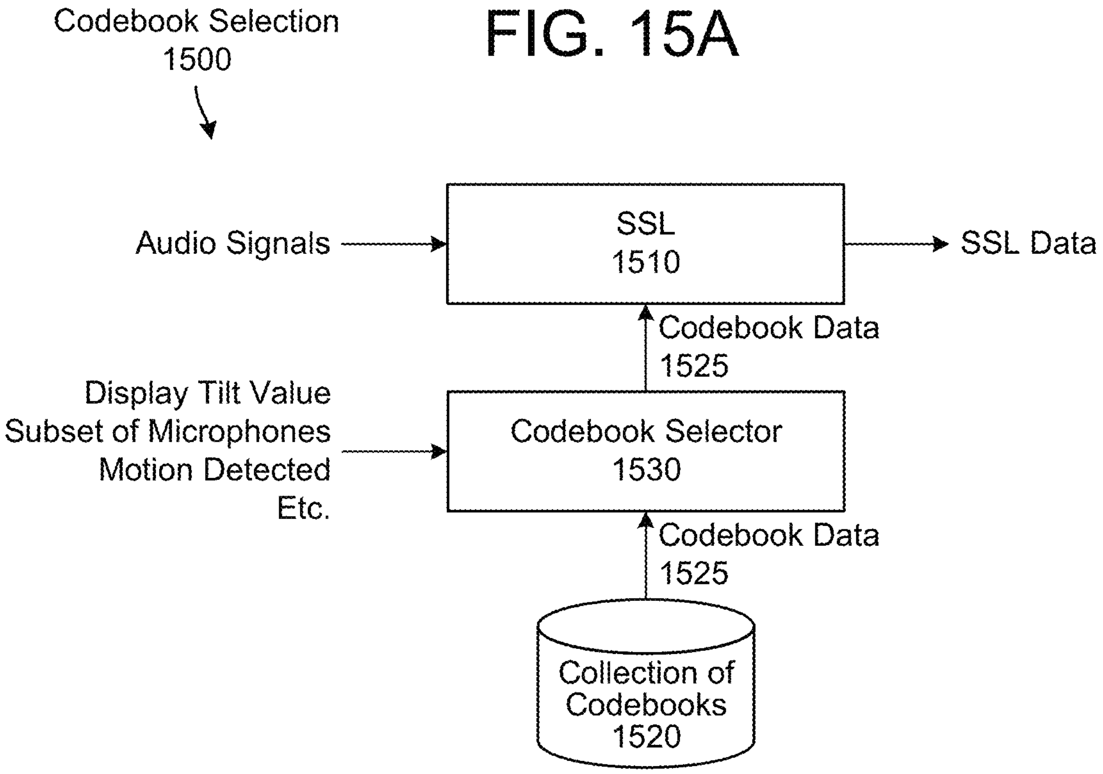
FIGS. 15A-15C are flowcharts illustrating example methods for dynamically selecting and/or adjusting delay-direction codebooks according to embodiments of the present disclosure.
Figure 15B:
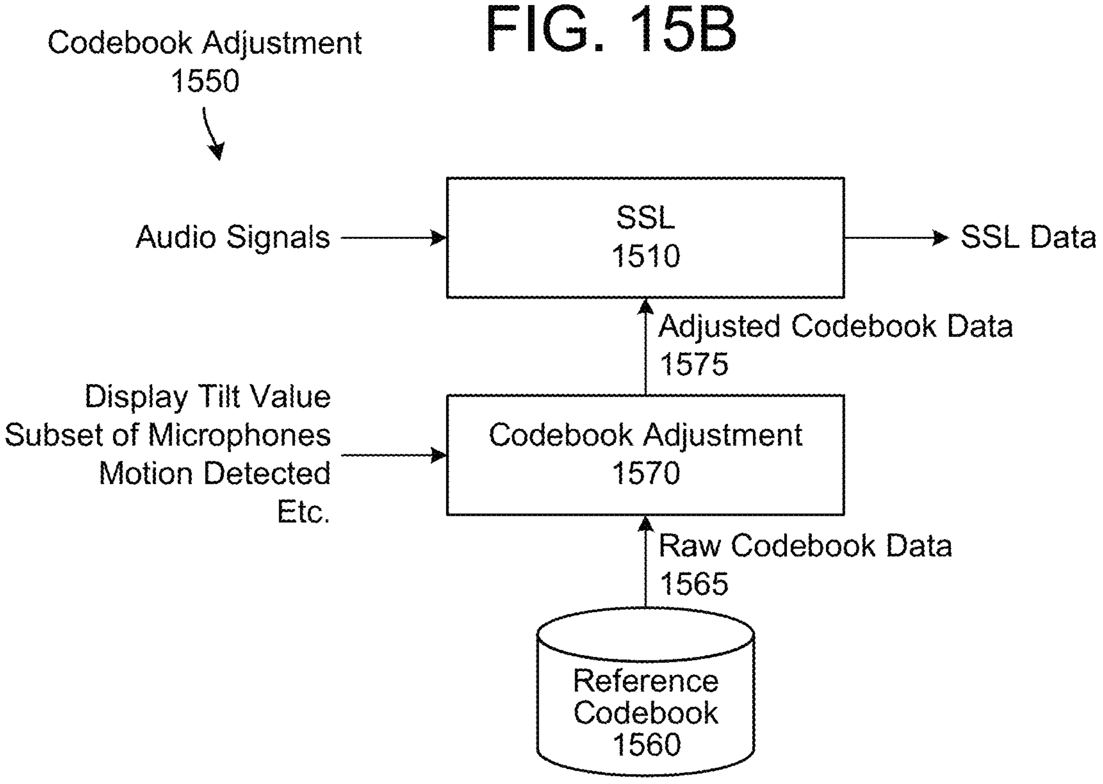
Figure 15C:
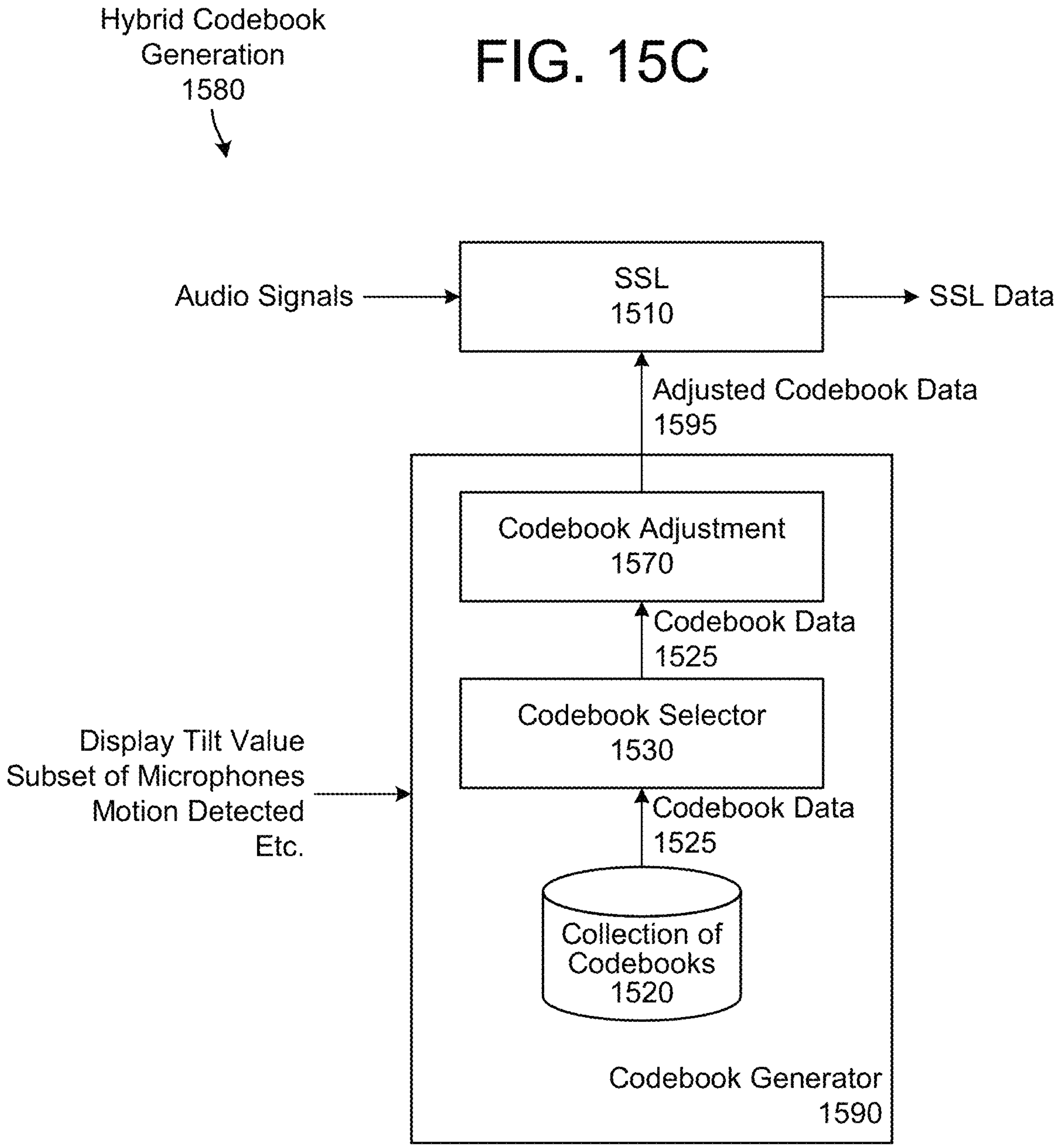

FIGS. 15A-15C are flowcharts illustrating example methods for dynamically selecting and/or adjusting delay-direction codebooks according to embodiments of the present disclosure. As illustrated in FIG. 15A, in some examples the device 110 may perform codebook selection 1500 to select a codebook from multiple codebooks. For example, the device 110 may include a collection of codebooks 1520 and a codebook selector 1530 configured to select codebook data 1525 from the collection of codebooks 1520. As illustrated in FIG. 15A, the codebook selector 1530 may select based on a display tilt value, a subset of microphones, motion detected, and/or the like, although the disclosure is not limited thereto. A sound source localization (SSL) component may receive audio signals and use the codebook data 1525 selected by the codebook selector 1530 to generate SSL data.

As illustrated in FIG. 15B, in other examples the device 110 may perform codebook adjustment 1550 to adjust a reference codebook based on an input. For example, the device 110 may include a reference codebook 1560 and a codebook adjustment component 1570. The codebook adjustment component 1570 may be configured to receive raw codebook data 1565 from the reference codebook 1560 and perform an adjustment to generate adjusted codebook data 1575. The codebook adjustment component 1570 may perform the adjustment based on input data, such as a display tilt value, a subset of microphones, motion detected, and/or the like, although the disclosure is not limited thereto. The SSL component 1510 may receive the audio signals and use the adjusted codebook data 1575 to generate the SSL data.

As illustrated in FIG. 15C, in some examples the device 110 may perform hybrid codebook generation 1580 to select a reference codebook and perform adjustments based on an input. For example, a codebook generator 1590 may include the collection of codebooks 1520, the codebook selector 1530, and the codebook adjustment component 1570. Thus, depending on the inputs, the codebook selector 1530 may be configured to select codebook data 1525 from the collection of codebooks 1520 and the codebook adjustment component 1570 may be configured to perform an adjustment to the codebook data 1525 to generate adjusted codebook data 1595. The SSL component 1510 may receive the audio signals and use the adjusted codebook data 1595 to generate the SSL data.

To illustrate an example using the tilt angles described above, the device 110 may be configured to tilt a display of the device 110 from a first tilt angle (e.g., screen vertical, or 0°) to a second tilt angle (e.g., 65°), although the disclosure is not limited thereto. If the microphone array is fixed to the display of the device 110, then tilting the display also tilts the microphone array, which may cause sound source localization (SSL) processing to not be accurate. For example, a first delay-direction codebook derived at a given tilt angle may be partially or completely invalid at another tilt angle.

To improve SSL processing, the device 110 may determine a tilt of the display (e.g., tilt angle) and may use this tilt angle to generate codebook data with which to perform SSL processing. In the codebook selection 1500 example illustrated in FIG. 15A, the device 110 may include a collection of codebooks 1520, with each codebook derived from a particular tilt angle. For example, the collection of codebooks 1520 may include six separate codebooks corresponding to 10° increments in the tilt angle. Thus, the device 110 may determine the tilt angle associated with the display and select the closest codebook to use to perform SSL processing.

In the codebook adjustment 1550 example illustrated in FIG. 15B, instead of including multiple codebooks, the device 110 may include a single reference codebook and may adjust the codebook based on the tilt angle. In some examples, the reference codebook 1560 may be derived at a reference tilt angle, and the device 110 may (a) determine an elevation difference between (i) a current tilt angle associated with the display and (ii) the reference tilt angle, and (b) adjust the reference codebook 1560 based on the difference. For example, the device 110 may adjust the reference codebook 1560 by rotating its direction vectors based on the elevation difference. The device 110 may then use the adjusted codebook data 1575 to perform SSL processing.

One way to adjust the codebook is by multiplying each three-dimensional (3D) direction vector (e.g., $u^T=[x, y, z]$) with a 3×3 rotation matrix of form:

$$J_y(\theta) = \begin{bmatrix} \cos\theta & 0 & \sin\theta \\ 0 & 1 & 0 \\ -\sin\theta & 0 & \cos\theta \end{bmatrix} \quad [10]$$

where θ denotes the delta angle, and the rotated direction vector is another 3D vector given by J·u, although the disclosure is not limited thereto.

Figure 16:
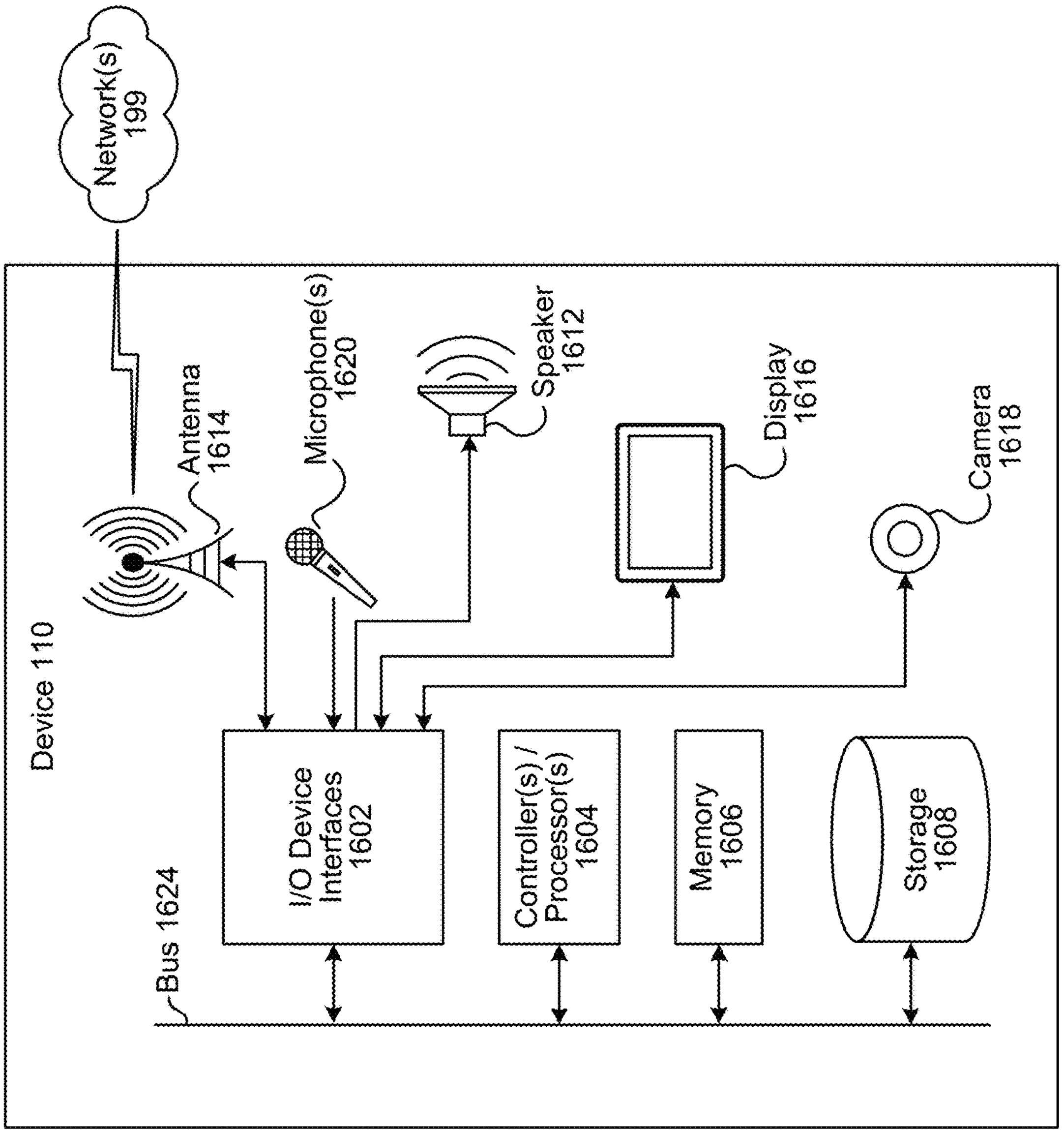
FIG. 16 is a block diagram conceptually illustrating example components of a device according to embodiments of the present disclosure.
Figure 17:
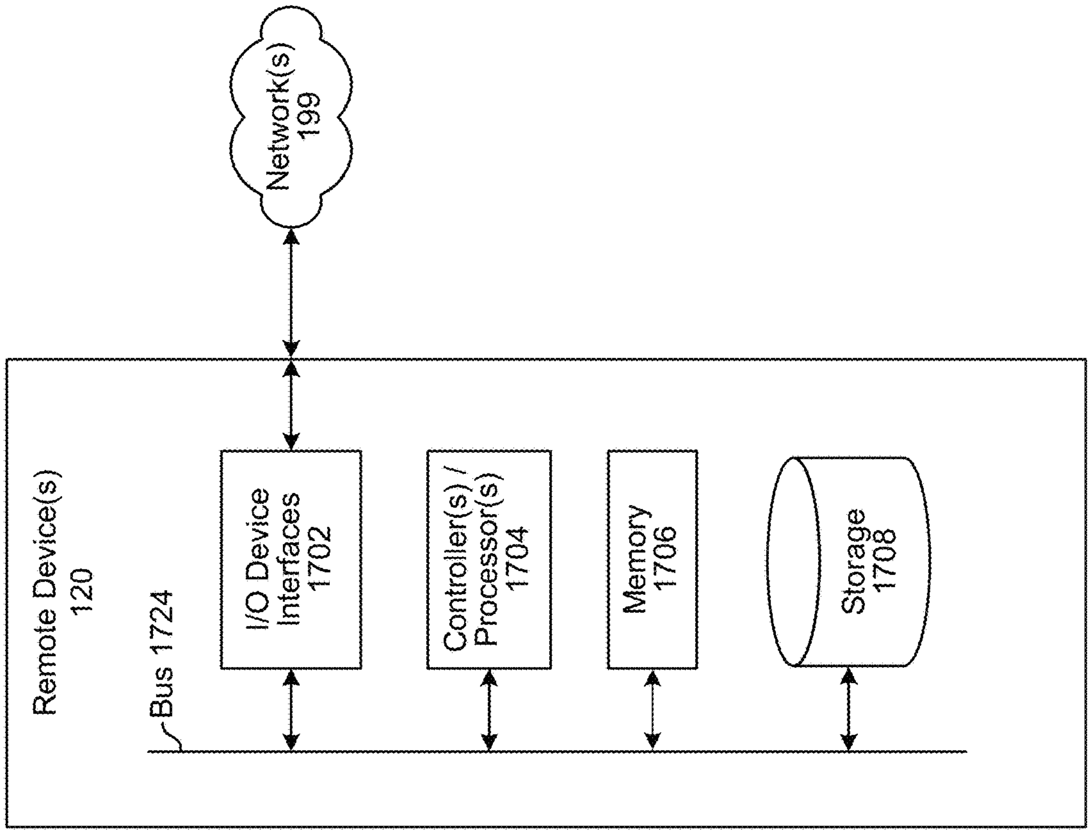
FIG. 17 is a block diagram conceptually illustrating example components of a remote system according to embodiments of the present disclosure.

FIG. 16 is a block diagram conceptually illustrating a device 110 that may be used with the system. FIG. 17 is a block diagram conceptually illustrating example components of remote device(s) 120 according to embodiments of the present disclosure. The remote device(s) 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote device(s) 120 may be configured to operate using one or more of a client-server model, a computer bureau model, grid computing techniques, fog computing techniques, mainframe techniques, utility computing techniques, a peer-to-peer model, sandbox techniques, or other computing techniques.

Each of these devices (110/120) may include one or more controllers/processors (1604/1704), which may each include a central processing unit (CPU) for processing data and computer-readable instructions, and a memory (1606/1706) for storing data and instructions of the respective device. The memories (1606/1706) may individually include volatile random access memory (RAM), non-volatile read only memory (ROM), non-volatile magnetoresistive memory (MRAM), and/or other types of memory. Each device (110/120) may also include a data storage component (1608/1708) for storing data and controller/processor-executable instructions. Each data storage component (1608/1708) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1602/1702).

Computer instructions for operating each device (110/120) and its various components may be executed by the respective device's controller(s)/processor(s) (1604/1704), using the memory (1606/1706) as temporary "working" storage at runtime. A device's computer instructions may be stored in a non-transitory manner in non-volatile memory (1606/1706), storage (1608/1708), or an external device(s). Alternatively, some or all of the executable instructions may be embedded in hardware or firmware on the respective device in addition to or instead of software.

Each device (110/120) includes input/output device interfaces (1602/1702). A variety of components may be connected through the input/output device interfaces (1602/1702), as will be discussed further below. Additionally, each device (110/120) may include an address/data bus (1624/1724) for conveying data among components of the respective device. Each component within a device (110/120) may also be directly connected to other components in addition to (or instead of) being connected to other components across the bus (1624/1724).

Referring to FIG. 16, the device 110 may include input/output device interfaces 1602 that connect to a variety of components such as an audio output component such as a speaker 1612, a wired headset or a wireless headset (not illustrated), or other component capable of outputting audio. The device 110 may also include an audio capture component. The audio capture component may be, for example, a microphone 1620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1616 for displaying content and/or a camera 1618 to capture image data, although the disclosure is not limited thereto.

Via antenna(s) 1614, the input/output device interfaces 1602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1602/1702) may also include communication components that allow data to be exchanged between devices such as different physical servers in a collection of servers or other components.

The components of the device(s) (110/120) may include their own dedicated processors, memory, and/or storage. Alternatively, one or more of the components of the device(s) (110/120) may utilize the I/O interfaces (1602/1702), processor(s) (1604/1704), memory (1606/1706), and/or storage (1608/1708) of the device(s) (110/120).

As noted above, multiple devices may be employed in a single system. In such a multi-device system, each of the devices may include different components for performing different aspects of the system's processing. The multiple devices may include overlapping components. The components of the device(s) (110/120), as described herein, are illustrative, and may be located as a stand-alone device or may be included, in whole or in part, as a component of a larger device or system.

Figure 18:
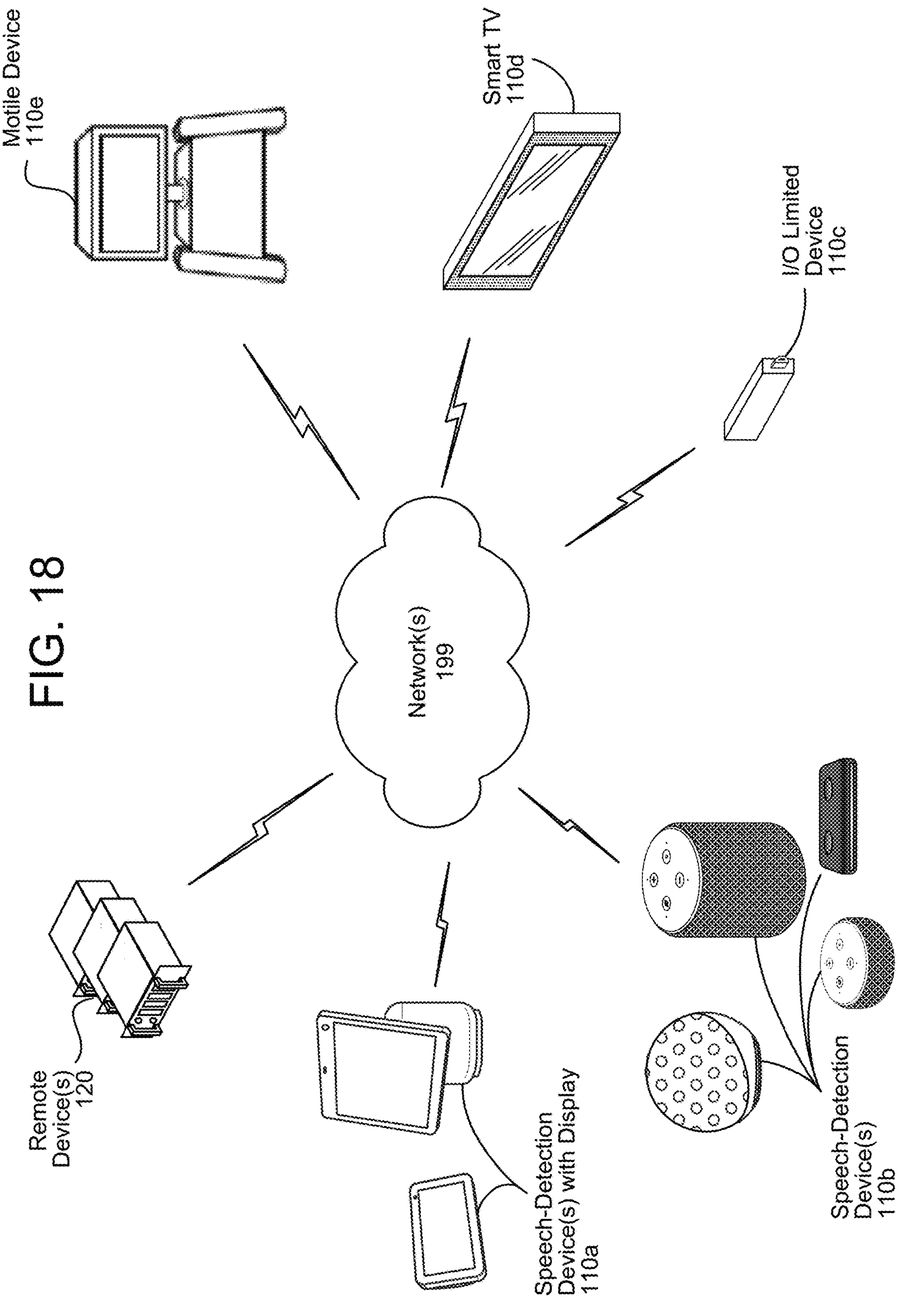
FIG. 18 illustrates an example of a computer network for use with a speech processing system.

As illustrated in FIG. 18, multiple devices (110*a*-110*e*, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device with display 110*a*, a speech-detection device 110*b*, an input/output (I/O) limited device 110*c* (e.g., a device such as a FireTV stick or the like), a display/smart television 110*d*, a motile device 110*e*, and/or the like may be connected to the network(s) 199 through a wireless service provider, over a WiFi or cellular network connection, or the like. Other devices are included as network-connected support devices, such as remote device(s) 120 and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:

generating audio data using a microphone array including a first microphone, a second microphone, and a third microphone;

determining, using the audio data, first delay vector data associated with a first sound source, the first delay vector data including a first time delay between receipt, by the first microphone, of audio output by the first sound source and receipt of the audio by the second microphone and a second time delay between receipt of the audio by the first microphone and receipt of the audio by the third microphone;

determining, using the audio data, a first power value corresponding to the first delay vector data;

determining, using stored data associated with at least one position range relative to the microphone array and with at least one of a plurality of data records representing a uniform size position range, that the first delay vector data is associated with a first data record of the plurality of data records, wherein the first data record represents a first position range relative to the microphone array;

determining, using the stored data and the first delay vector data, a first value associated with the first data record, the first value indicating a relative weight of the first delay vector data for the first position range;

determining a first product of the first power value and the first value; and determining, using the first product, a first average power value associated with the first data record.

2. The computer-implemented method of claim 1, further comprising:

determining a second average power value associated with a second data record of the plurality of data records;

determining that the first average power value is higher than the second average power value;

determining a first direction corresponding to the first delay vector data; and associating the first direction with the first sound source.

3. The computer-implemented method of claim 1, further comprising:

determining a second power value corresponding to second delay vector data;

determining, using the stored data, that the second delay vector data is associated with the first data record;

determining, using the stored data and the second delay vector data, a second value associated with the first data record; and determining a second product of the second power value and the second value;

wherein determining the first average power value further comprises:

determining a first sum of at least the first product and the second product, determining a second sum of at least the first value and the second value, and determining the first average power value by dividing the first sum by the second sum.

4. The computer-implemented method of claim 1, wherein the first position range extends from a first azimuth value to a second azimuth value and from a first elevation value to a second elevation value.

5. The computer-implemented method of claim 1, wherein the plurality of data records includes a first number of data records corresponding to a first elevation range, and a second plurality of data records includes a second number of data records corresponding to a second elevation range that is different from the first elevation range.

6. The computer-implemented method of claim 1, further comprising:

determining that a first direction vector corresponds to the first position range;

determining that the first direction vector is associated with the first delay vector data;

determining that a second direction vector corresponds to the first position range;

determining that the second direction vector is associated with the first delay vector data; and determining the first value associated with the first data record, wherein the first value indicates a number of direction vectors that (i) correspond to the first position range and (ii) are associated with the first delay vector data.

7. The computer-implemented method of claim 6, further comprising:

determining that a third direction vector corresponds to the first position range;

determining that the third direction vector is associated with second delay vector data;

determining a second value indicating a second number of direction vectors that correspond to the first position range and are associated with the second delay vector data; and determining a third value indicating a total number of direction vectors that correspond to the first position range, the third value including at least the first value and the second value.

8. The computer-implemented method of claim 1, further comprising:

generating a plurality of direction vectors;

determining a location difference between a first location associated with the first microphone and a second location associated with the second microphone;

determining, using the location difference, the first time delay; and determining, using the plurality of direction vectors, a plurality of delay vectors including the first delay vector data.

9. The computer-implemented method of claim 1, further comprising:

determining a tilt angle associated with the microphone array;

determining, using the tilt angle, first codebook data including a plurality of direction vectors and a plurality of delay vectors, the plurality of delay vectors including the first delay vector data; and determining, using the first codebook data, that the first delay vector data corresponds to a first direction.

10. The computer-implemented method of claim 1, further comprising:

determining a tilt angle associated with the microphone array;

determining, using the tilt angle, a rotation matrix;

generating, using the rotation matrix and first codebook data, second codebook data including a plurality of direction vectors and a plurality of delay vectors, the plurality of delay vectors including the first delay vector data; and determining, using the second codebook data, that the first delay vector data corresponds to a first direction.

11. A system comprising:

at least one processor; and memory including instructions operable to be executed by the at least one processor to cause the system to:

generate audio data using a microphone array including a first microphone, a second microphone, and a third microphone;

determine, using the audio data, first delay vector data associated with a first sound source, the first delay vector data including a first time delay between receipt, by the first microphone, of audio output by the first sound source and receipt of the audio by the second microphone and a second time delay between receipt of the audio by the first microphone and receipt of the audio by the third microphone;

determine, using the audio data, a first power value corresponding to the first delay vector data;

determine, using stored data associated with at least one position range relative to the microphone array and with at least one of a plurality of data records representing a uniform size position range, that the first delay vector data is associated with a first data record of the plurality of data records, wherein the first data record represents a first position range relative to the microphone array;

determine, using the stored data and the first delay vector data, a first value associated with the first data record, the first value indicating a relative weight of the first delay vector data for the first position range;

determine a first product of the first power value and the first value; and determine, using the first product, a first average power value associated with the first data record.

12. The system of claim 11, wherein the memory further comprises instructions that, when executed by the at least one processor, further cause the system to:

determine a second average power value associated with a second data record of the plurality of data records;

determine that the first average power value is higher than the second average power value;

determine a first direction corresponding to the first delay vector data; and associate the first direction with the first sound source.

13. The system of claim 11, wherein the memory further comprises instructions that, when executed by the at least one processor, further cause the system to:

determine a second power value corresponding to second delay vector data;

determine, using the stored data, that the second delay vector data is associated with the first data record;

determine, using the stored data and the second delay vector data, a second value associated with the first data record;

determine a second product of the second power value and the second value;

determine a first sum of at least the first product and the second product;

determine a second sum of at least the first value and the second value; and determine the first average power value by dividing the first sum by the second sum.

14. The system of claim 11, wherein the first position range extends from a first azimuth value to a second azimuth value and from a first elevation value to a second elevation value.

15. The system of claim 11, wherein the plurality of data records includes a first number of data records corresponding to a first elevation range, and a second plurality of data records includes a second number of data records corresponding to a second elevation range that is different from the first elevation range.

16. The system of claim 11, wherein the memory further comprises instructions that, when executed by the at least one processor, further cause the system to:

determine that a first direction vector corresponds to the first position range;

determine that the first direction vector is associated with the first delay vector data;

determine that a second direction vector corresponds to the first position range;

determine that the second direction vector is associated with the first delay vector data; and determine the first value associated with the first data record, wherein the first value indicates a number of direction vectors that (i) correspond to the first position range and (ii) are associated with the first delay vector data.

17. The system of claim 16, wherein the memory further comprises instructions that, when executed by the at least one processor, further cause the system to:

determine that a third direction vector corresponds to the first position range;

determine that the third direction vector is associated with second delay vector data;

determine a second value indicating a second number of direction vectors that correspond to the first position range and are associated with the second delay vector data; and determine a third value indicating a total number of direction vectors that correspond to the first position range, the third value including at least the first value and the second value.

18. The system of claim 11, wherein the memory further comprises instructions that, when executed by the at least one processor, further cause the system to:

generate a plurality of direction vectors;

determine a location difference between a first location associated with the first microphone and a second location associated with the second microphone;

determine, using the location difference, the first time delay; and determine, using the plurality of direction vectors, a plurality of delay vectors including the first delay vector data.

19. The system of claim 11, wherein the memory further comprises instructions that, when executed by the at least one processor, further cause the system to:

determine a tilt angle associated with the microphone array;

determine, using the tilt angle, first codebook data including a plurality of direction vectors and a plurality of delay vectors, the plurality of delay vectors including the first delay vector data; and determine, using the first codebook data, that the first delay vector data corresponds to a first direction.

20. The system of claim 11, wherein the memory further comprises instructions that, when executed by the at least one processor, further cause the system to:

determine a tilt angle associated with the microphone array;

determine, using the tilt angle, a rotation matrix;

generate, using the rotation matrix and first codebook data, second codebook data including a plurality of direction vectors and a plurality of delay vectors, the plurality of delay vectors including the first delay vector data; and determine, using the second codebook data, that the first delay vector data corresponds to a first direction.

* * * * *